(12) United States Patent
Gandhi et al.

(10) Patent No.: US 10,524,092 B2
(45) Date of Patent: Dec. 31, 2019

(54) TASK AUTOMATION USING LOCATION-AWARENESS OF MULTIPLE DEVICES

(71) Applicant: Microsoft Technology Licensing, LLC, Redmond, WA (US)

(72) Inventors: Dhiraj Pramod Gandhi, Redmond, WA (US); Shai Guday, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/424,132

(22) Filed: Feb. 3, 2017

(65) Prior Publication Data
US 2018/0199156 A1   Jul. 12, 2018

Related U.S. Application Data

(60) Provisional application No. 62/445,445, filed on Jan. 12, 2017.

(51) Int. Cl.
*H04W 24/00* (2009.01)
*H04W 4/02* (2018.01)
*H04W 4/06* (2009.01)

(52) U.S. Cl.
CPC ............ *H04W 4/023* (2013.01); *H04W 4/06* (2013.01)

(58) Field of Classification Search
CPC ......... H04W 4/23; H04W 4/06; H04W 4/029; H04W 4/02; H04L 67/20; G06F 3/167;
(Continued)

(56) References Cited

U.S. PATENT DOCUMENTS 7,343,312 B2   3/2008   Capek et al.
7,343,313 B2   3/2008   Dorenbosch et al.
(Continued)

FOREIGN PATENT DOCUMENTS

KR   20070118415 A * 12/2007
WO   WO-2007051128 A2 * 5/2007 ............. G06Q 10/02
(Continued)

OTHER PUBLICATIONS

Janarthanan, et al., "Location based preference aware recommendation using sparse geo social networking data", In International Journal of Pharmacy & Technology, vol. 8, Issue 1, Mar. 26, 2016, pp. 10708-10715.
(Continued)

*Primary Examiner* — Mahendra R Patel
(74) *Attorney, Agent, or Firm* — Mark K. Young; Mayer & Williams PC

(57) ABSTRACT

A location-aware task automation service is configured to dynamically monitor locations and context associated with a group of users of mobile devices to identify a commonly shared goal of the group and perform automated actions to assist the group in achieving the goal. For example, the common group goal could include being at the same location at the same time to attend an event such as a show or party. By tracking the location of each member of the group, and monitoring applicable context such as traffic conditions, the service can predict when one or more of the group members is likely to be late to the event, and then perform automated tasks to assist the members in dealing with the delay such as identifying a faster route to the location. The service can also let other group members know of the delay by sending out notifications to their devices.

19 Claims, 30 Drawing Sheets

(58) Field of Classification Search
CPC ...... G06F 3/0484; G06N 5/003; G06N 7/005; G06Q 10/063114; G06Q 10/1095
USPC ................ 455/456.3, 456.1, 456.2; 701/465; 345/420
See application file for complete search history.

(56) References Cited

U.S. PATENT DOCUMENTS

| | | | | |
|---|---|---|---|---|
| 8,695,078 | B2 * | 4/2014 | Low | H04W 4/08 370/254 |
| 8,768,739 | B2 | 7/2014 | Perrella et al. | |
| 9,195,968 | B2 * | 11/2015 | Caldwell | H04L 67/2809 |
| 9,253,227 | B2 | 2/2016 | Jackson et al. | |
| 2007/0118415 | A1 * | 5/2007 | Chen | G06Q 10/02 705/5 |
| 2008/0189301 | A1 | 8/2008 | Chen et al. | |
| 2009/0150193 | A1 * | 6/2009 | Hong | G06Q 10/02 705/5 |
| 2009/0182630 | A1 * | 7/2009 | Otto | G06Q 20/20 705/14.1 |
| 2009/0215469 | A1 * | 8/2009 | Fisher | H04L 51/32 455/456.3 |
| 2013/0297551 | A1 * | 11/2013 | Smith | G06N 5/02 706/48 |
| 2014/0195303 | A1 * | 7/2014 | Jarrett | G06Q 50/01 705/7.33 |
| 2014/0229099 | A1 * | 8/2014 | Garrett | G06Q 10/063114 701/465 |
| 2015/0045068 | A1 * | 2/2015 | Soffer | H04W 4/025 455/456.3 |
| 2015/0119080 | A1 | 4/2015 | Husain et al. | |
| 2015/0294275 | A1 * | 10/2015 | Richardson | G06F 16/26 705/7.18 |
| 2016/0105768 | A1 * | 4/2016 | Pinard | H04W 4/21 455/457 |
| 2016/0300078 | A1 * | 10/2016 | Wooldridge | G06F 21/6272 |
| 2016/0379105 | A1 * | 12/2016 | Moore, Jr. | G06F 3/167 706/11 |

FOREIGN PATENT DOCUMENTS

| | | | | |
|---|---|---|---|---|
| WO | WO-2011095897 A3 * | 3/2012 | | G01C 21/343 |
| WO | WO-2013144759 A1 * | 10/2013 | | G01C 21/20 |
| WO | WO-2014205763 A1 * | 12/2014 | | G06Q 10/10 |
| WO | WO-2016097457 A1 * | 6/2016 | | H04L 51/20 |
| WO | WO-2018005252 A1 * | 1/2018 | | H04L 65/1093 |
| WO | WO-2018204157 A1 * | 11/2018 | | G06Q 10/06316 |

OTHER PUBLICATIONS

Refanidis, et al., "Planning services for individuals: a new challenge for the planning community", In Workshop on Connecting Planning Theory with Practice, Retrieved on: Aug. 25, 2016, 6 pages.

* cited by examiner

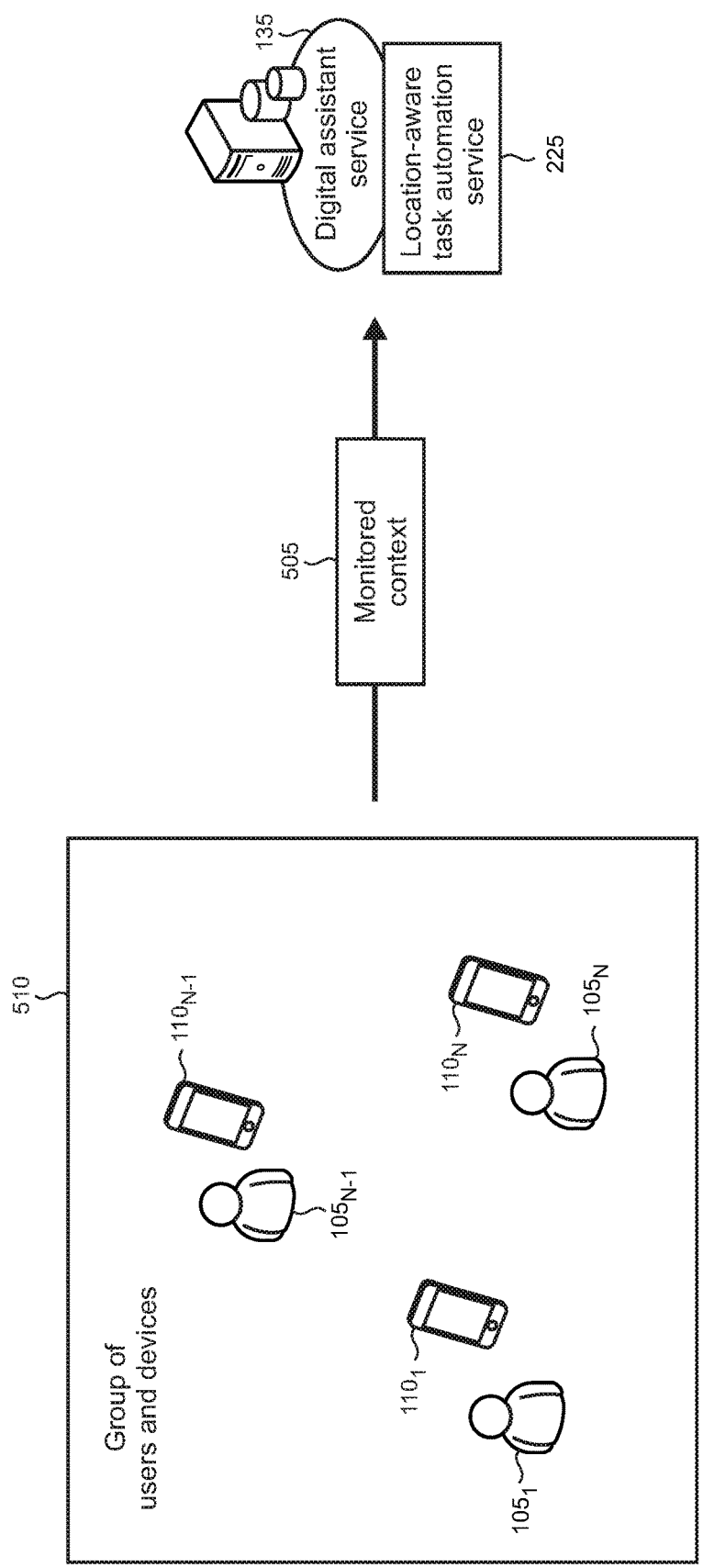

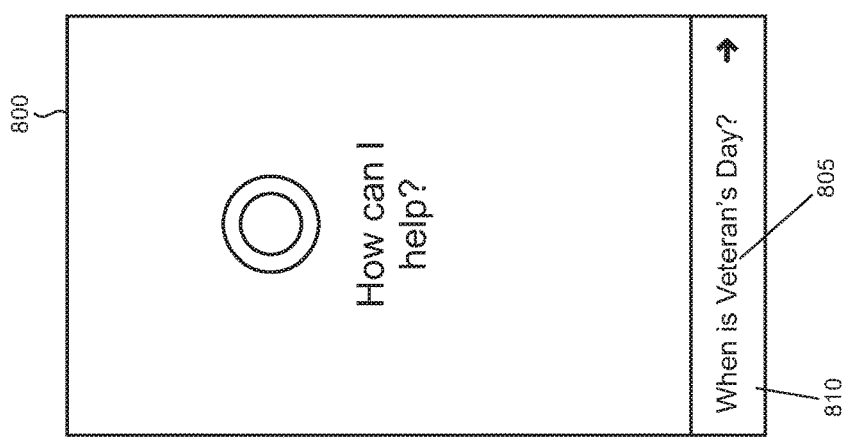
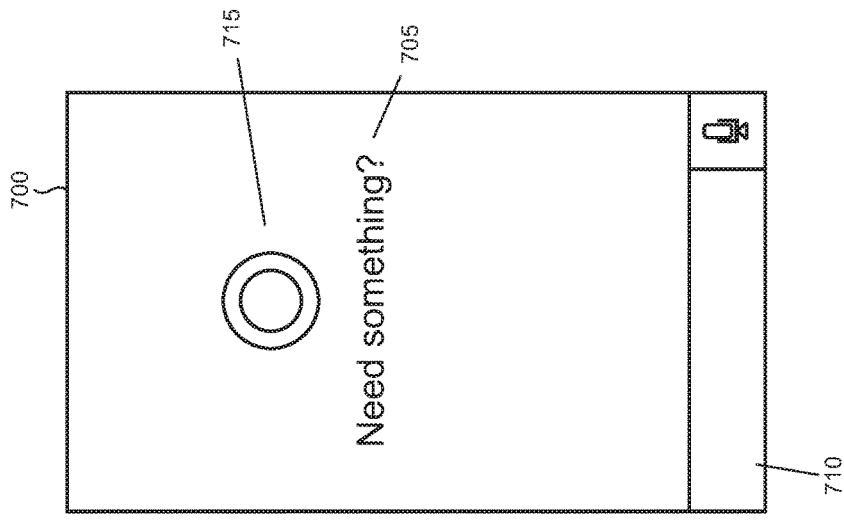
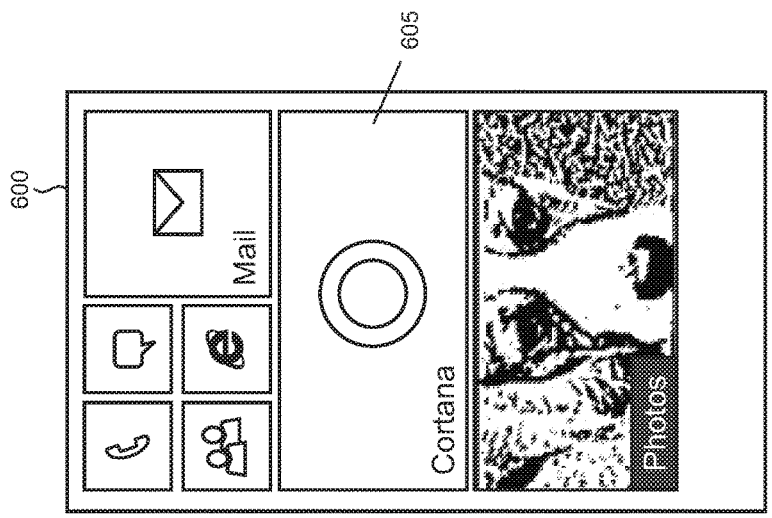

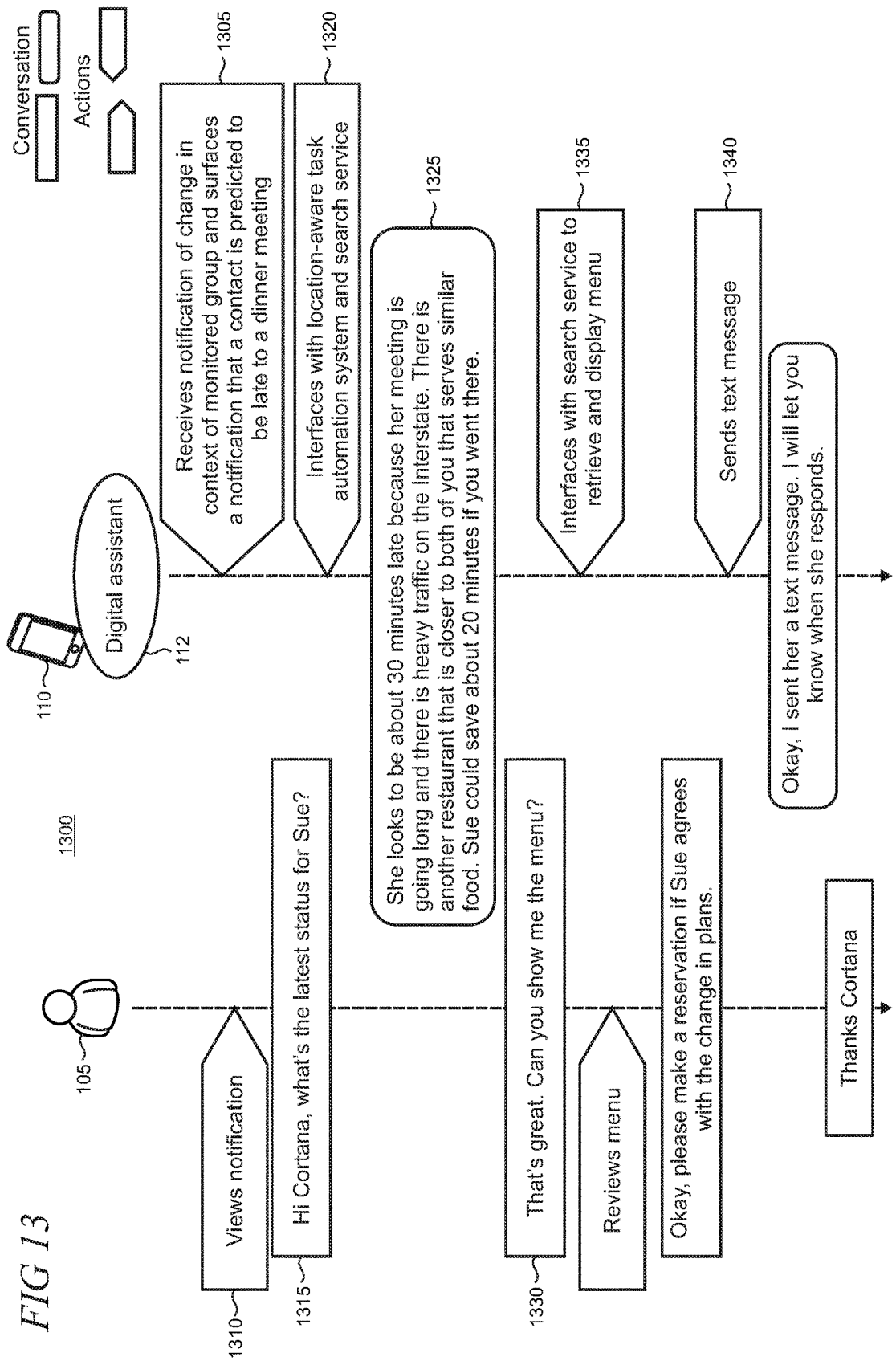

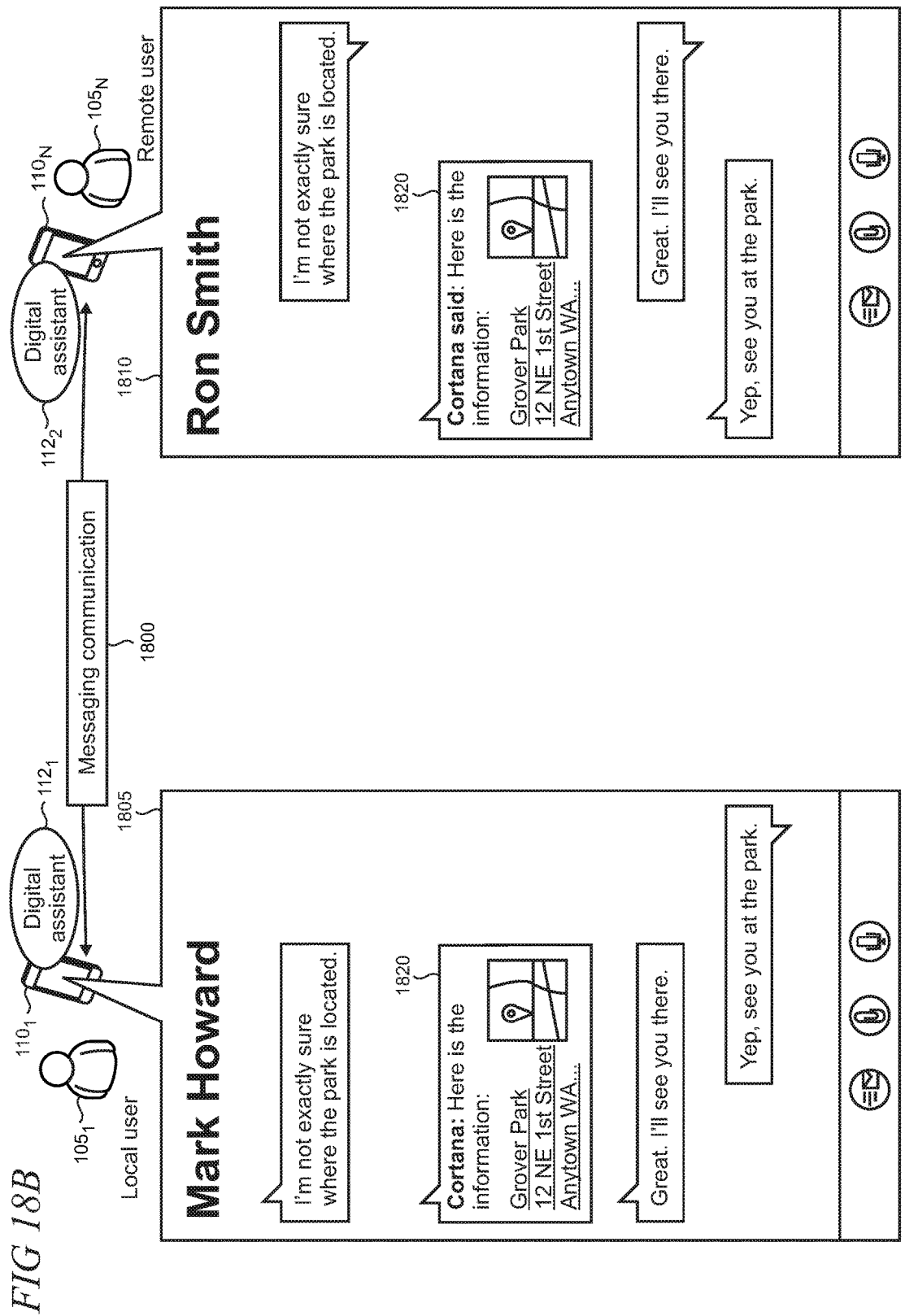

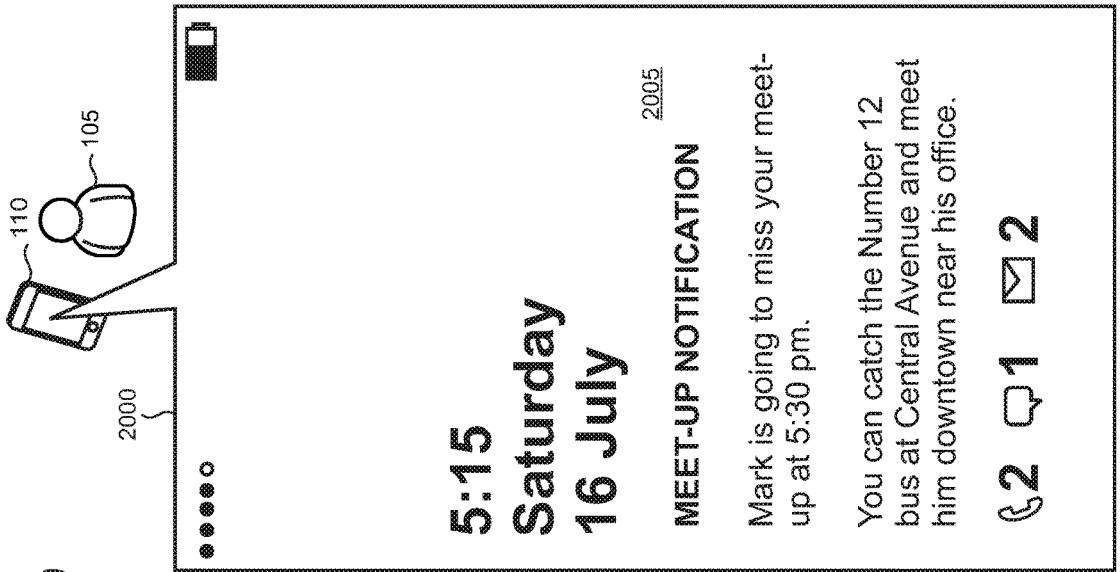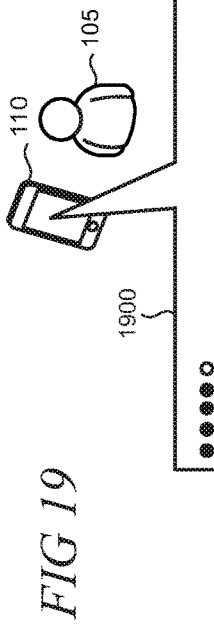

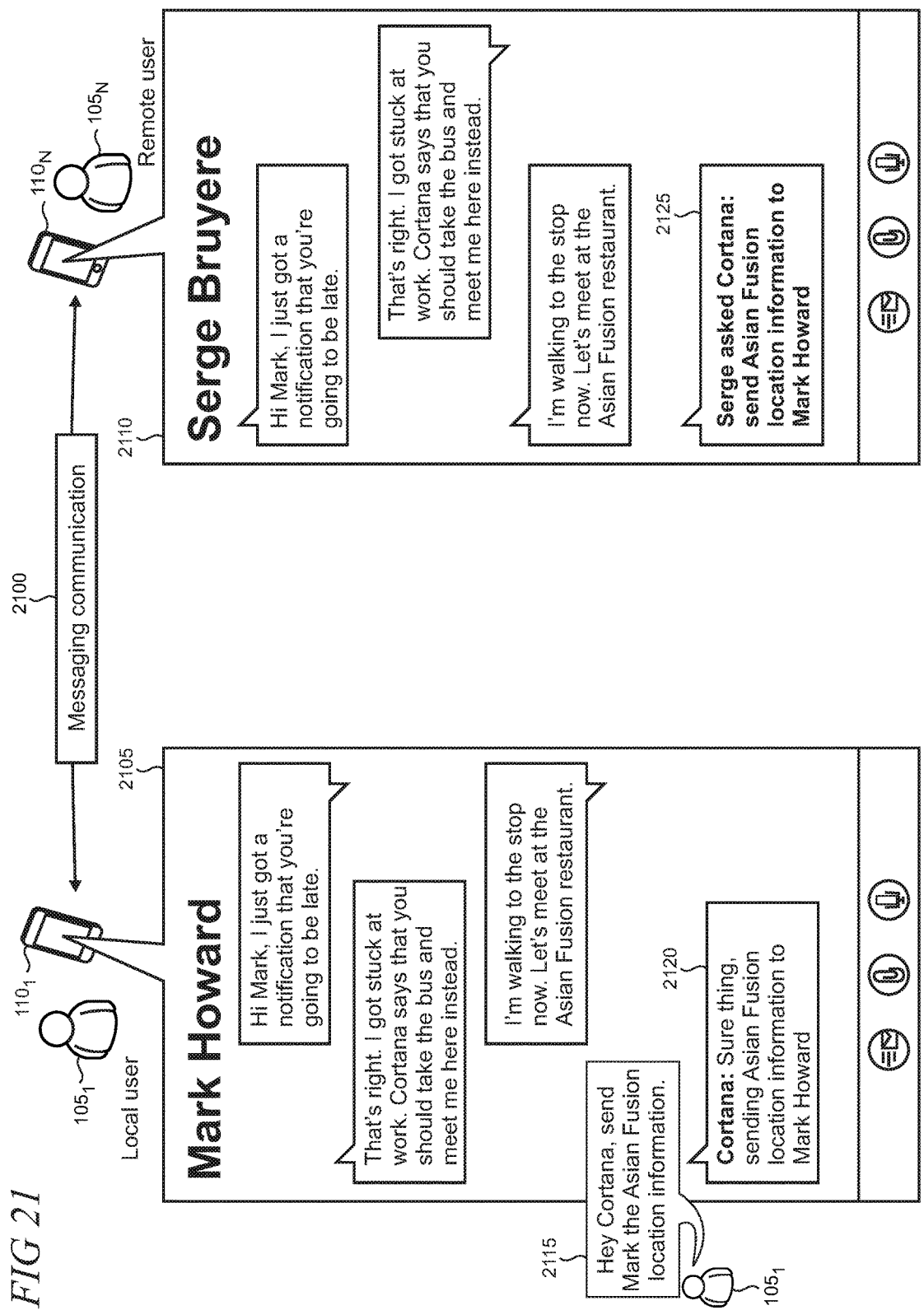

TASK AUTOMATION USING LOCATION-AWARENESS OF MULTIPLE DEVICES

CROSS-REFERENCE TO RELATED APPLICATION

This application claims benefit and priority to U.S. Provisional Application Ser. No. 62/445,445 filed Jan. 12, 2017, entitled "Task Automation Using Location-Awareness of Multiple Devices" which is incorporated herein by reference in its entirety.

BACKGROUND

Digital assistants can provide a variety of features for device users and can make it easier to interact with devices to perform tasks, get information, and stay connected with friends and colleagues using voice interactions and other inputs. Digital assistants are sometimes referred to as "virtual assistants."

SUMMARY

A location-aware task automation service is configured to dynamically monitor locations and context associated with a group of users of mobile devices such as smartphones, tablets, laptop computers, wearable computing devices, and the like to identify a commonly shared goal of the group and perform automated actions to assist the group in achieving the goal. For example, the common group goal could include being at the same location at the same time to attend an event such as a show or party. By tracking the location of each member of the group, and monitoring applicable context such as traffic conditions, the service can predict when one or more of the group members is likely to be late to the event, and then perform automated tasks to assist the members in dealing with the delay such as identifying a faster route to the location. The service can also let other group members know of the delay by sending out notifications to their devices.

The location-aware task automation service is configured to provide solutions that are optimized for the group as a whole. For example, the service can predict when one or more members in a group of users who share a common restaurant reservation are running late and are likely to miss the reservation. By tracking the current location of each of the group members and analyzing traffic conditions and other context, the service can identify a new reservation time that would work best for the group. The service can automatically interact with the restaurant's reservation system to change the reservation and then send a notification to a device of each of the group members as to the new reservation time. The service can also find a different restaurant if that is a more optimal solution for the group members. For example, finding a new restaurant location that is closer to the group member who is running late may save the most time or may represent a compromise that is most fair to the entire group.

Users can sign up for the location-aware task automation service to opt in to location tracking and some anonymized data collection describing user interactions and behaviors with a device so that the service can take various actions to assist the users in meeting a group goal. Users can be associated into groups such as sport teams, office colleagues, club members, family members and the like. The groups do not have to be permanent, formal groups. Ad-hoc, one-off groups can also be supported by the service. For example, a group can be a college football team with a full schedule of practices and games, an active family of four, or two friends meeting at a downtown coffee shop in the afternoon.

Users can identify groups to the location-aware task automation service through a user interface (UI) exposed on a device, or the service can use various contextual data and monitored user behaviors and device interaction history to identify groups in an automated manner. For example, the service can determine that a mother and daughter regularly meet after school each day at the bus stop. The service can then notify the daughter when her mother is running late and let the daughter know to get off at a later stop to meet her. A user can also utilize the UI to explicitly inform the location-aware task automation service of a change in status, for example when the user learns that a meeting is going to end later than planned.

The location-aware task automation service can access users' calendar or scheduling applications to identify appointments, meetings, and tasks. The service can identify events and tasks that are common to multiple users, form a group, and then monitor the group members' location, status, traffic conditions, and other context to make predictions and perform automated tasks for the group as needed to help the group achieve a common goal. For example, the service can read messages exchanged between two friends on a messaging application and determine that they are planning to meet for dinner. The service can then monitor the group of two and propose a good solution if the service determines that either or both friends are running late.

In an illustrative implementation, various user experiences, content, or features provided by the location-aware task automation service can be integrated with a digital assistant and rendered as a native digital assistant user experience on a given mobile device. The digital assistant is configured to actively participate to achieve the group's goal, for example, by determining a mobile device user's intent, performing tasks and actions, providing status, and interacting with the user as needed. The digital assistant can interact with first and third party applications, search services, and other resources to increase the scope of information and services that are available to the location-aware task automation service.

Anonymized data collected from the service users (i.e., crowd-sourcing) can be utilized to continuously improve the methodologies and algorithms for group identification, prediction, and task automation. A UI can also be arranged to collect explicit feedback from users regarding the accuracy of the service's groupings, predictions, and the quality of the automated tasks or suggestions The location-aware task automation service enables a mobile device to be operated to support location-based features and functions with the effect that location-based hardware and sensors used to support context-awareness on a mobile device are effectively managed and controlled. Such task automation can also be expected to be more efficient than manual operations performed by a user which may be time consuming and prone to error. The increased efficiency may enable the mobile device to better utilize available computing resources including network bandwidth, processing cycles, memory, and battery life in some cases. These resources can be limited in some cases, so their efficient utilization is desirable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 5 shows the location-aware task automation service monitoring context that is associated with a group of devices and users;

FIGS. 6, 7, and 8 show screen captures of illustrative graphical user interfaces (GUIs) that are exposed on a device by a digital assistant;

FIG. 13 shows a transcript of an illustrative user experience with a digital assistant;

FIGS. 18A and 18B show an illustrative text messaging session between two device users;

FIGS. 19 and 20 show illustrative notifications generated by a location-aware task automation system;

FIG. 21 shows another illustrative text messaging session between two device users;

Like reference numerals indicate like elements in the drawings. Elements are not drawn to scale unless otherwise indicated.

DETAILED DESCRIPTION

Figure 1:
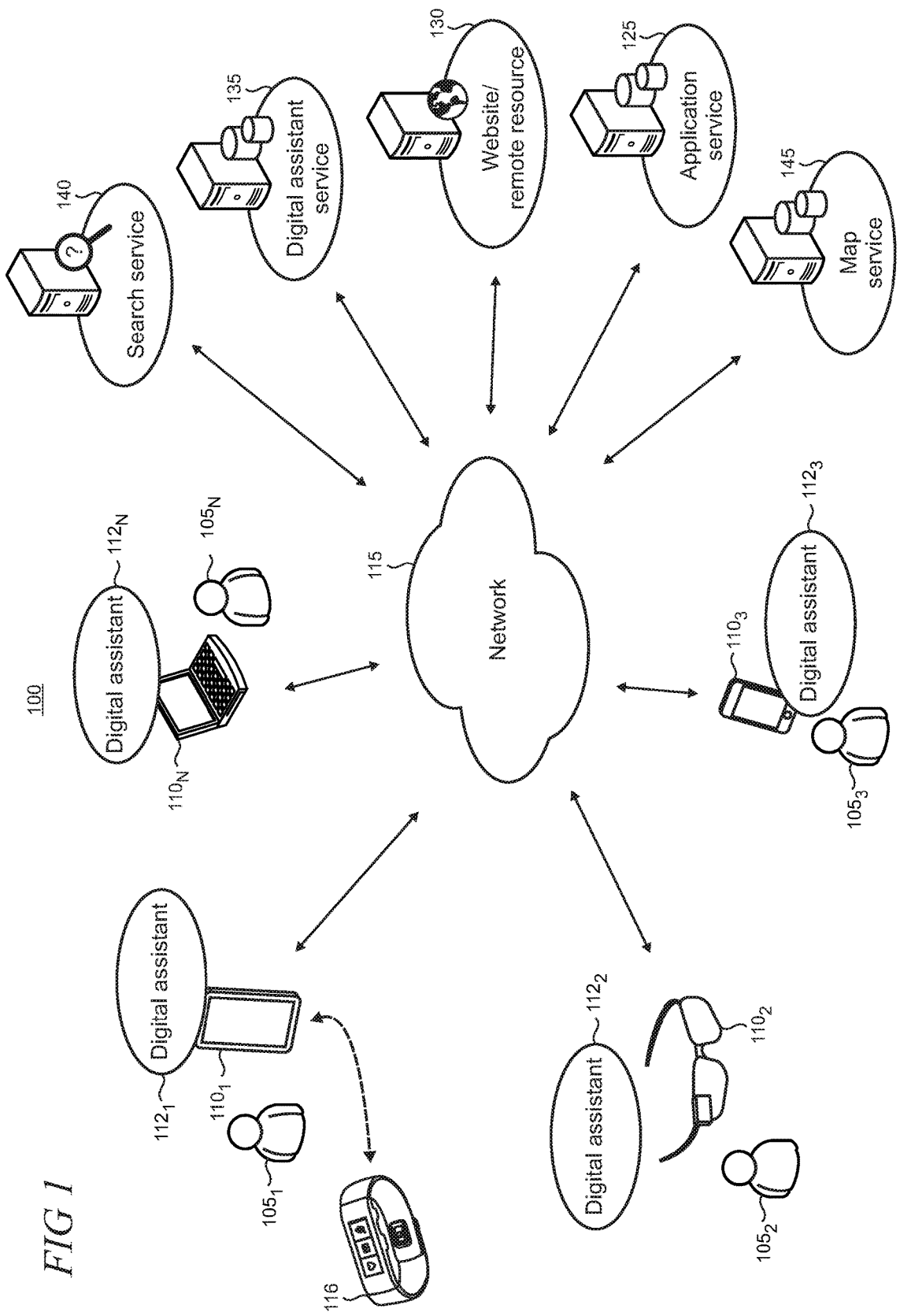
FIG. 1 shows an illustrative computing environment in which devices supporting a digital assistant can communicate and interact with various services over a network.

FIG. 1 shows an illustrative computing environment 100 in which the same or different users 105 may employ devices 110 that can communicate with other devices and various services over a network 115. Each device 110 may include an instance of a digital assistant 112. The devices 110 can support telephony capabilities (e.g., voice and/or video) in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices 116, such as wristbands and other wearable computing devices may also be present in the environment 100. Such accessory device 116 typically is adapted to interoperate with a coupled device 110 using a short range communication protocol like Bluetooth to support functions such as monitoring of the wearer's fitness and/or physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

The devices 110 can typically utilize the network 115 to access and/or implement various user experiences. The network can include any of a variety of network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet or include interfaces that support a connection to the Internet so that the devices 110 can access content and render user experiences provided by various remote or cloud-based application services 125 and websites 130. The application services 125 and websites 130 can support a diversity of features, services, and user experiences such as social networking, mapping, news and information, entertainment, travel, productivity, finance, etc. A digital assistant service 135, search service 140, and map service 145 (each described in more detail below) are also present in the computing environment 100. The map and search services can be first party services or third party services depending on the circumstances surrounding a given implementation.

Figure 2:
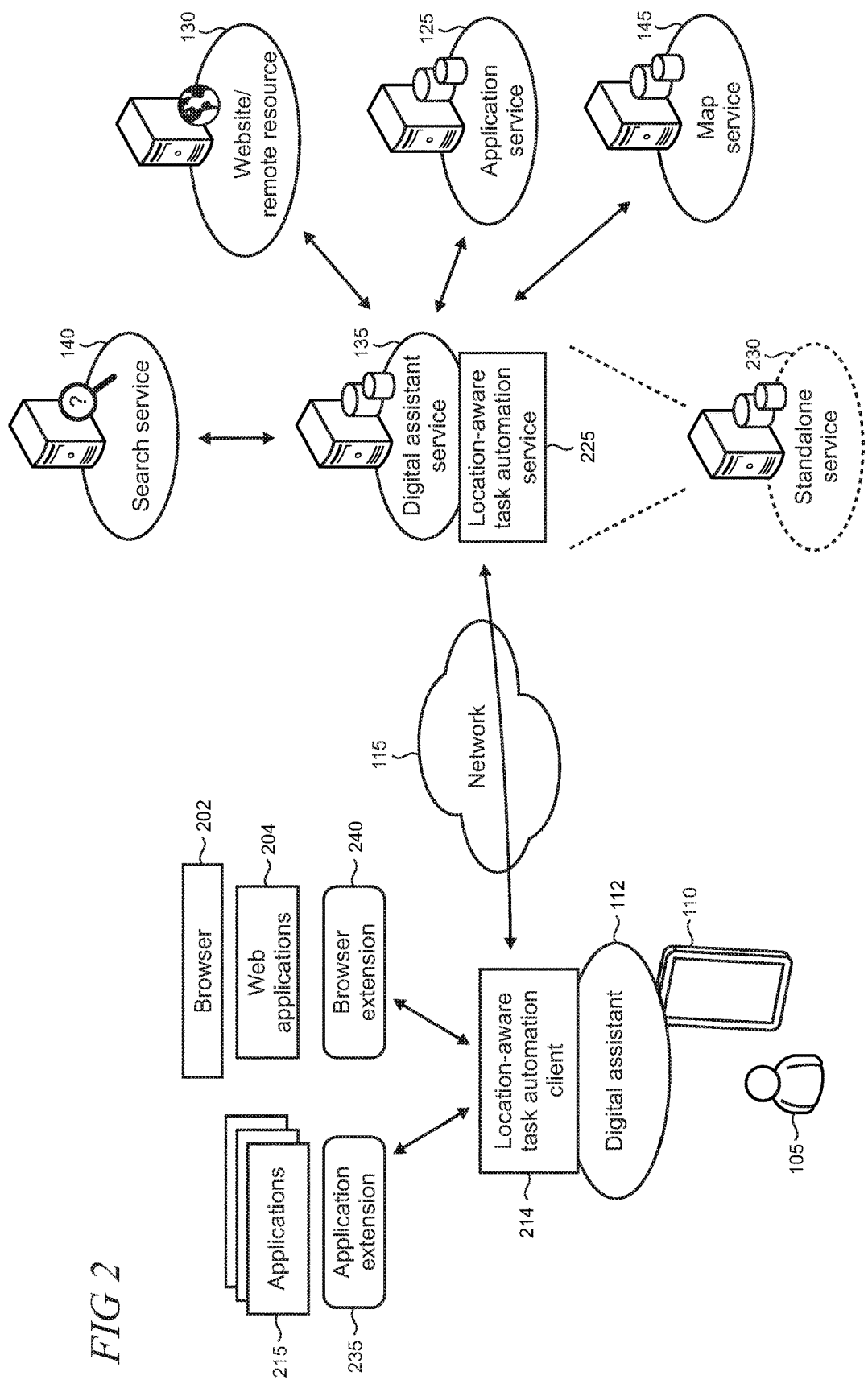
FIG. 2 shows a local location-aware task automation client interacting with a remote location-aware task automation service.

As shown in FIG. 2, a device 110 can include local components such as a browser 202 and/or one or more applications 215 that can respectively facilitate interaction with one or more websites 130 and remote application services 125. For example, in some use scenarios, a user 105 may launch a locally executing application that communicates over the network 115 to an application service 125 (FIG. 1) in order to retrieve data and obtain services to enable various features and functions, provide information, and/or support user experiences that can be supported on various ones of the user interfaces on a local device 110 such as graphical user interfaces (GUIs) and audio user interfaces. In some use scenarios and/or at different times, an application 215 may operate locally on the device without needing to interface with a remote service.

The local digital assistant 112 interoperates in this illustrative example with a location-aware task automation client 214 that typically communicates over the network 115 with a remote location-aware task automation service 225 that is supported by the remote digital assistant service 135. In this particular example, the location-aware task automation client is configured to interact with the digital assistant 112, and the location-aware task automation service 225 is supported by the digital assistant service 135. However, the location-aware task automation client can be separately instantiated from the digital assistant in some cases. In addition, the location-aware task automation service 225 may be optionally provided in whole or part (as indicated by the dashed lines) by a standalone service 230 or be incorporated into another service.

The location-aware task automation client 214 may interact with applications 215 through one or more application extensions 235 or other suitable interface access to enable application content and user experiences. Similarly, the location-aware task automation client 214 may interact with the browser 202 and web applications 204 through a browser extension 240 or other suitable interface to enable access to web applications content and user experiences.

In some implementations, the location-aware task automation client can be arranged as a standalone component that provides features and/or services without interacting with a remote resource or service (aside from periodic updates, and the like). Typically, the interoperability between the location-aware task automation system and digital assistant is implemented so that the location-aware task automation system can render user experiences, features, and content using the digital assistant with a similar and consistent sound, look, and feel in most cases so that transitions between the location-aware task automation system and the digital assistant are handled smoothly and the experiences are rendered seamlessly to the user.

Figure 3:
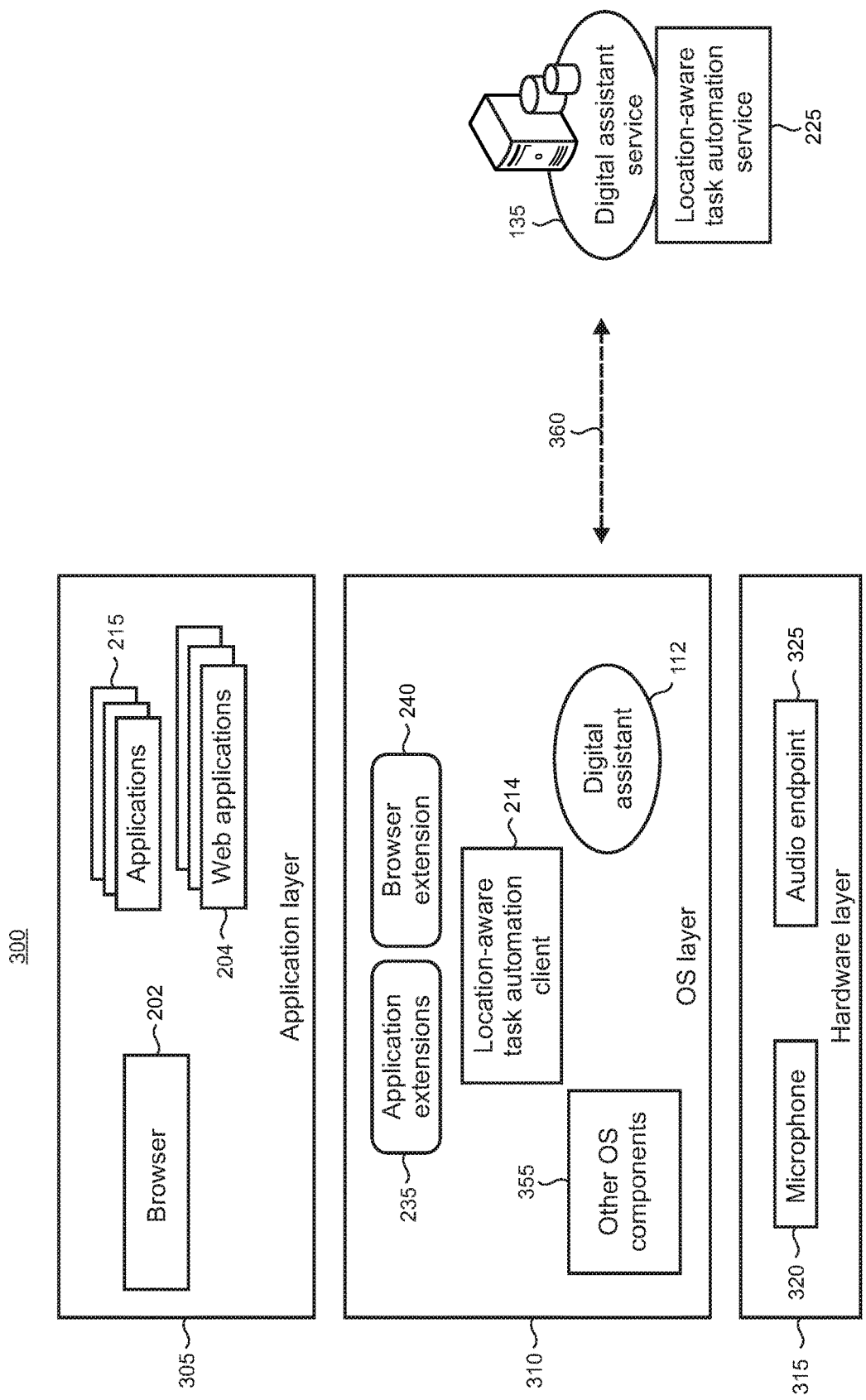
FIG. 3 shows an illustrative layered architecture.

FIG. 3 shows an illustrative layered architecture 300 that may be instantiated on a given device 110. The architecture 300 is typically implemented in software, although combinations of software, firmware, and/or hardware may also be utilized in some cases. The architecture 300 is arranged in layers and includes an application layer 305, an OS (operating system) layer 310, and a hardware layer 315. The hardware layer 315 provides an abstraction of the various hardware used by the device 110 (e.g., input and output devices, networking and radio hardware, etc.) to the layers above it. In this illustrative example, the hardware layer supports a microphone 320, and an audio endpoint 325 which may include, for example, the device's internal speaker, a wired or wireless headset/earpiece, external speaker/device, and the like.

The application layer 305 in this illustrative example supports the browser 202 and various applications 215 and web applications 204 (productivity, social, entertainment, news and information applications, etc.). The browser and each of the applications may be configured to expose an extensibility functionality through respective application extensions 235 and browser extension 240 such as an API (application programming interface), or other suitable components to facilitate interactions with the digital assistant and other components in the OS layer. For example, the extensibility functionality may enable the digital assistant and/or location-aware task automation client to access an email application to retrieve the user's emails and read them aloud to the user. The applications are often implemented using locally executing code. However, in some cases, these applications can rely on services and/or remote code execution provided by remote servers or other computing platforms such as those supported by a service provider or other cloud-based resources.

The OS layer 310 supports the digital assistant 112, the location-aware task automation client 214, the application extensions 235, the browser extension 240, and various other OS components 355. In alternative implementations, the location-aware task automation client 214, the application extensions 235, and the browser extension 240 can be optionally instantiated as components in the application layer 305. In typical implementations, the digital assistant 112 can interact with the digital assistant service 135, as indicated by line 360. That is, the digital assistant 112 in some implementations can partially utilize or fully utilize remote code execution supported at the service 135, or using other remote resources. In addition, it may utilize and/or interact with other OS components 355 (and/or other components that are instantiated in the other layers of the architecture 300) as may be needed to implement the various features and functions described herein. In some implementations, some or all of the functionalities supported by one or more of the location-aware task automation client 214, the application extensions 235, and/or the browser extension 240 can be incorporated into the digital assistant 112, and the particular division of functionality between the components can be selected as a matter of design choice.

Figure 4:
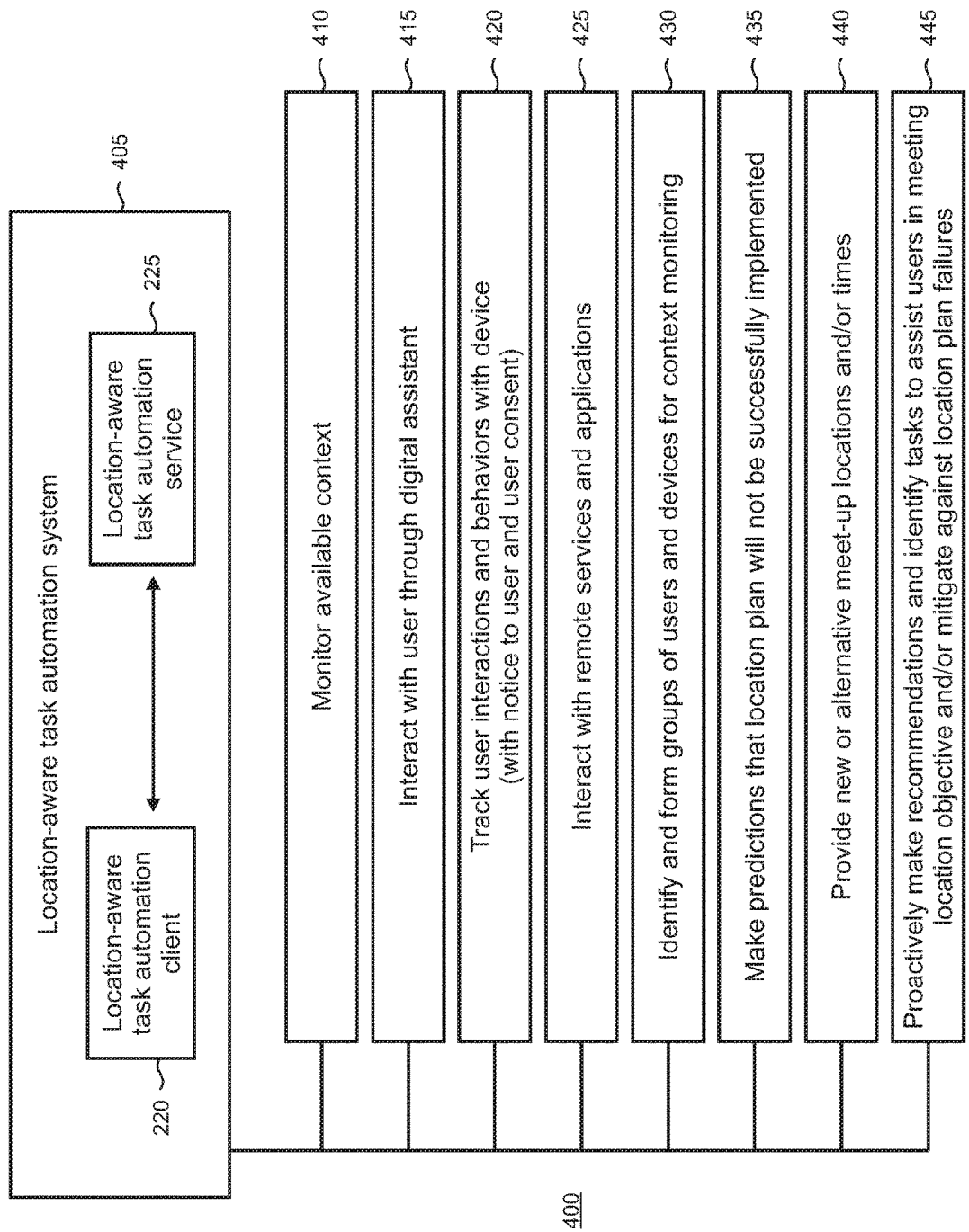
FIG. 4 shows illustrative functions that may be performed by a location-aware task automation system.

The location-aware task automation client 214 and location-aware task automation service 225 are collectively referred to herein as a location-aware task automation system 405, as shown in FIG. 4. The location-aware task automation system 405 can expose a variety of features and capabilities according to the requirements of a particular implementation of the present task automation using location-awareness of multiple devices. For example, as shown in taxonomy of functions 400, the location-aware task automation system 405 can monitor available context 410, interact with the user through the digital assistant 415, track user interactions and behaviors with the device 110 (typically such tracking is performed with notice to the user and user consent) 420, interact with remote services 425 (e.g., map service 145 and search service 140), identify and form groups of users and devices for context monitoring 430, make predictions that a particular location plan will not be met 435, provide new or alternative meet-up locations and/or times 440, and proactively make recommendations and identify tasks to be performed 445 to assist users in meeting location objectives or mitigate against risks of failing to meet location objectives. The functions 400 are illustrative and not all the functions need to be performed by the task automation system 405 in every implementation. The functions 400 are described in more detail in the illustrative examples and scenarios that follow.

As shown in FIG. 5, the location-aware task automation service 225 and/or system 405 (FIG. 4) may be configured to monitor context 505 using signals that are collected from a group 510 of multiple users 105 and respective devices 110. The group 510 can vary in size, composition, and permanence for given instances of task automation. That is, groups can be formal, informal, ad-hoc, temporary, or persistent. Users and devices can be members of multiple groups at the same time in some cases. Users can typically be provided with opportunities to opt in and opt out of signal collection to enable the location-aware task automation service to automatically identify groups and monitor context.

An instance of the digital assistant can be exposed to the user through a graphical user interface (GUI) that is displayed on a device. For example, FIGS. 6, 7, and 8 show various illustrative screen captures of GUIs that may be utilized in the present task automation using location-awareness of multiple devices. It is noted that the particular GUIs displayed in the drawings can vary from what are shown according to the needs of a particular implementation. GUI 600 in FIG. 6 shows the digital assistant (named "Cortana" in this example) represented by a tile 605 that is displayed along with tiles representing other applications, features, functions, or user experiences on a start screen of a device. The digital assistant may also be configured to be launched from any location within any GUI on the device, or from within any current user experience. For example, the user can be on a phone call, browsing the web, watching a video, or listening to music, and simultaneously launch the digital assistant from within any of those experiences. In some cases, the digital assistant can be invoked or launched through manipulation of a physical or virtual user control, and/or by voice control/command and/or sensed gesture in other cases.

When the user invokes the digital assistant, for example, by touching the tile 605 or by invoking a voice command or gesture, a GUI 700 shown in FIG. 7 is displayed on the device that includes a text string 705 that asks the user if something is needed. In alternative implementations, text to voice translation can be employed so that an audio message can be played in place of, or to supplement the text string 705. As shown, the GUI includes a box 710 that is configured for showing a textual representation of a received voice command/control or other user input.

One or more graphic objects 715 can be displayed on the GUI 700 to represent the digital assistant to the user. The graphic object 715 in this example is a circular shape that can be animated so that, for example, it changes its shape, color, transparency, motion, or appearance as the digital assistant performs tasks, provides information, interacts with the user, etc.

As shown in the GUI 800 in FIG. 8, the user has input the string "When is Veteran's Day" 805 into the box 810 using, for example, keypad input on a physical or virtual keypad, gesture, or voice. In response to the user input, the digital assistant can look up the requested information and provide an answer to the user using one or more of audio (e.g., voice), text, graphics, animations, video, and the like.

Figure 9:
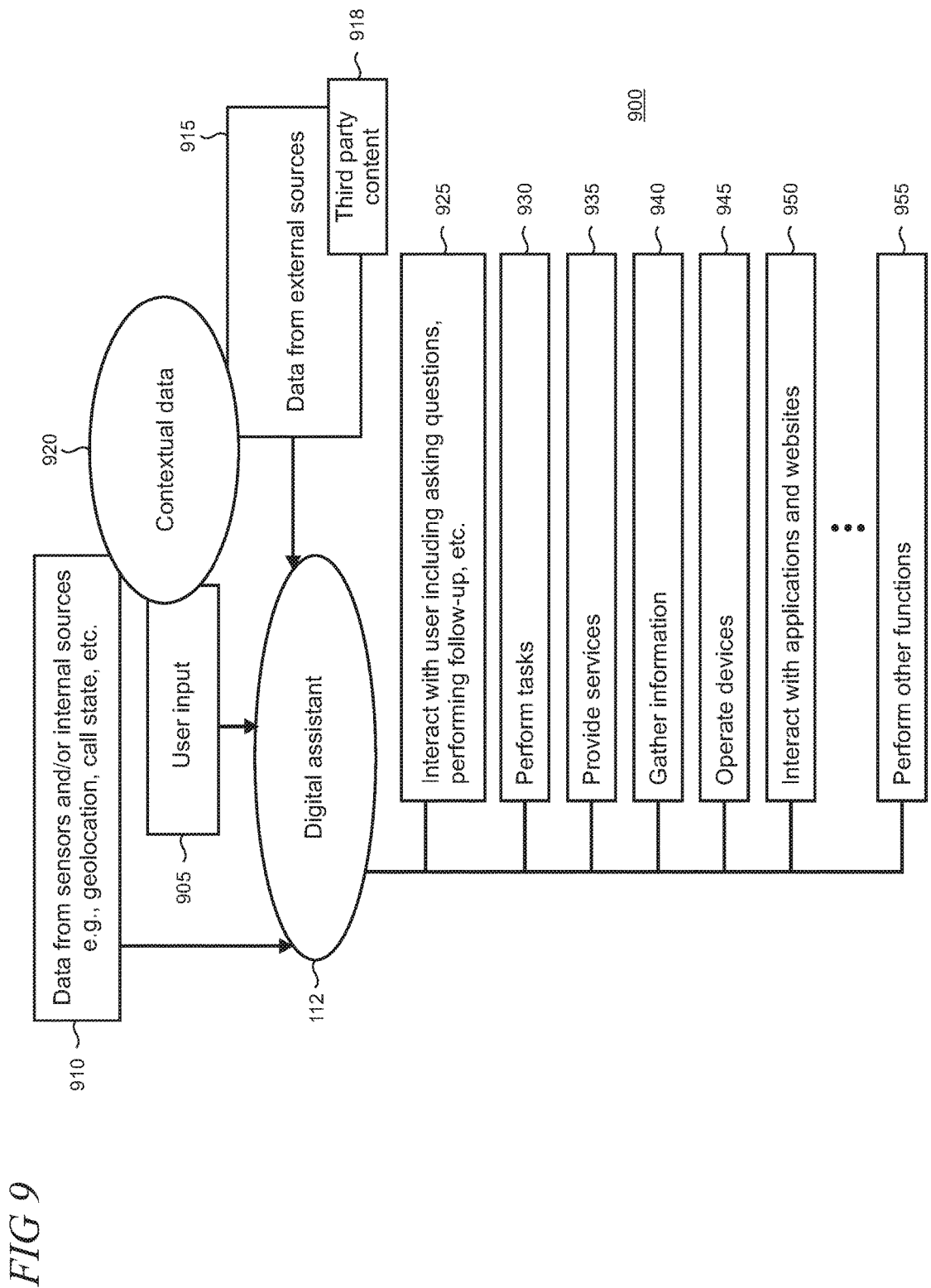
FIG. 9 shows illustrative inputs to a digital assistant and an illustrative taxonomy of general functions that may be performed by a digital assistant.

FIG. 9 shows an illustrative taxonomy of functions 900 that may typically be supported by the digital assistant 112 either natively or in combination with an application 215, browser 202 (FIG. 2), remote resources/services, or location-aware task automation system 405 (FIG. 4). Inputs to the digital assistant 112 typically can include user input 905, data from device sensors and/or internal sources 910, and data from external sources 915 which can include third-party content 918. For example, data from internal sources 910 may include the current location of the device 110 (FIG. 1) that is reported by a GPS (Global Positioning System) component on the device, or some other location-aware component or sensor. The externally sourced data 915 may include data provided, for example, by external systems, databases, services, and the like.

The various inputs can be used alone or in various combinations to enable the digital assistant 112 to utilize contextual data 920 when it operates. Contextual data is data that provides relevant context about a person (e.g., the user), an entity (e.g., one or more devices), or event and can be collected using a sensor package on a device that is configured to sense and analyze data about the user or device environmental surroundings. Sensors in the sensor package may include, for example, camera, accelerometer, location-awareness component, thermometer, altimeter, heart rate sensor, barometer, microphone, or proximity sensor, as described in more detail in the text below accompanying FIGS. 30, 31, and 32. Contextual data can also be collected from stored data that is associated with a person, entity, or event.

Contextual data can include, for example, time/date, the user's location, speed, acceleration, and/or direction of travel, environmental conditions (e.g., altitude, temperature, barometric pressure), user's physiological state, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, device type, device capabilities, communications network type and/or features/functionalities provided therein, mobile data plan restrictions/limitations, data associated with other parties to a communication (e.g., their schedules, preferences, etc.), and the like.

As shown, the digital assistant functions 900 illustratively include interacting with the user 925 (through a natural language user interface and other graphical interfaces, for example); performing tasks 930 (e.g., making note of appointments in the user's calendar, sending messages and emails, etc.); providing services 935 (e.g., answering questions from the user, mapping directions to a destination, setting alarms, forwarding notifications, reading emails, news, blogs, etc.); gathering information 940 (e.g., finding information requested by the user about a book or movie, locating the nearest Italian restaurant, etc.); operating devices 945 (e.g., setting preferences, adjusting screen brightness, turning wireless connections such as Wi-Fi and Bluetooth on and off, communicating with other devices, controlling smart appliances, etc.); interacting with applications, websites, and remote services and resources 950; and performing various other functions 955. The list of functions 900 is not intended to be exhaustive, and other functions may also be provided by the digital assistant 112, applications 215, and/or services/remote resources as may be needed for a given implementation of the task automation using location-awareness of multiple devices.

Figure 10:
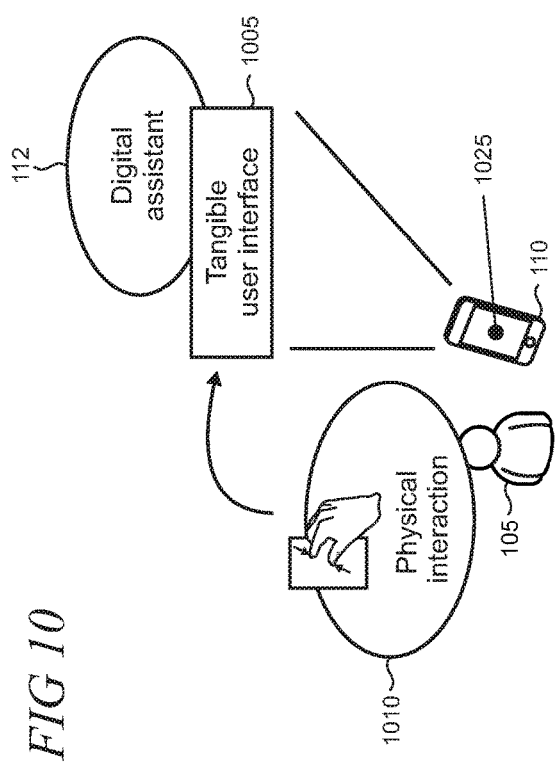

A user can typically interact with the digital assistant 112 in several ways depending on the features and functionalities supported by a given device 110. For example, as shown in FIG. 10, the digital assistant 112 may expose a tangible user interface 1005 that enables the user 105 to employ physical interactions 1010 in support of user experiences on the device 110. Such physical interactions can include manipulation of physical and/or virtual controls such as buttons, menus, keyboards, etc., using touch-based inputs like tapping, flicking, dragging, etc. on a touchscreen supporting a graphical user interface 1025, and the like.

Figure 11:
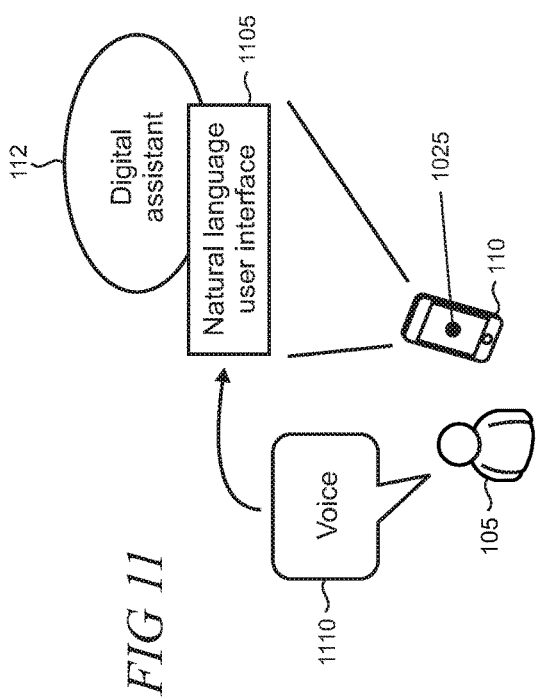

In some implementations, the digital assistant 112 may expose a natural language user interface 1105 shown in FIG. 11, or alternatively a voice command-based user interface (not shown), with which the user employs voice 1110 to provide various inputs to the device 110.

Figure 12:
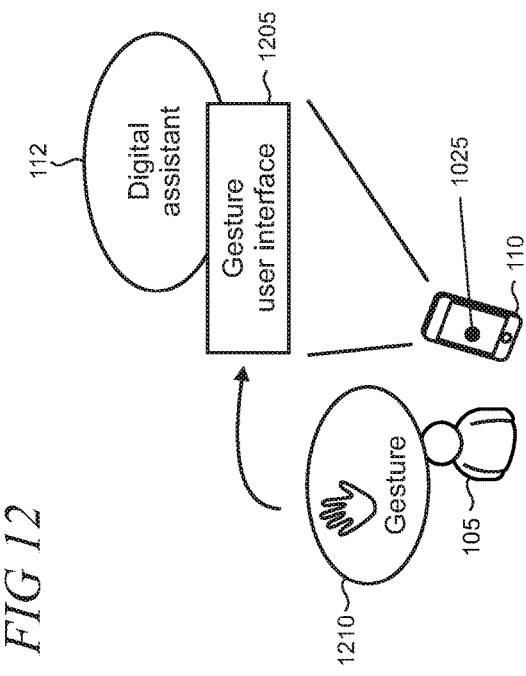
FIGS. 10, 11, and 12 show illustrative interfaces between a user and a digital assistant.

In other implementations, the digital assistant 112 may expose a gesture user interface 1205 shown in FIG. 12 with which the user 105 employs gestures 1210 to provide inputs to the device 110. The gestures 1210 can include touch-based gestures and touchless gestures. It is noted that in some cases, combinations of user interfaces may be utilized where the user may employ, for example, both voice, physical inputs, and sensed gestures to interact with the digital assistant 112 and the device 110. The user gestures can be sensed using various techniques such as optical sensing, touch sensing, proximity sensing, and the like.

Turning now to a presentation of examples of use scenarios, FIG. 13 shows a transcript 1300 of an illustrative user experience with a digital assistant 112. In the transcripts that follow, blocks are used to indicate conversation between the user 105 and the digital assistant, and flags are used to indicate actions. The illustrated use scenarios include verbal interactions between the user 105 and the digital assistant 112, but in alternative scenarios, the interactions can be performed through gestures and physical interactions with the device 110 (e.g., through touchscreen interactions and the like). The user 105 can interact with a single instance of the digital assistant 112 on a single device 110, or interact with multiple instances of the digital assistant 112 across multiple devices 110 in some cases. For example, the user may start a conversation with the digital assistant on a laptop computer and then finish the conversation on a smartphone.

In this user experience, at flag 1305, the digital assistant receives a notification from the location-aware task automation system 405 (FIG. 4) that it has detected a change in the monitored context of a group. The digital assistant surfaces a notification that a contact of the user (a person named Sue in this example) is predicted to be late to a dinner meeting. For example, the notification can be surfaced graphically using a small informational window (i.e., commonly referred to as "toast") that is displayed on the device GUI. Audio can accompany the surfaced graphic such as a chime or other tone in some implementations. Alternatively, the digital assistant can provide the notification using synthesized voice through an audio endpoint.

In this example, the group includes the user and her friend Sue. The location-aware task automation system 405 can automatically form the group, for example, by checking the user's calendar (and/or her friend's calendar) to identify that the two users share a common event (e.g., the dinner meet-up), at a common location (e.g., a restaurant) at a common time (e.g., the scheduled time). The location-aware task automation system may make a prediction that the friend is likely to miss the meet-up by monitoring context associated with the group of two. For example, the location-aware task automation service can monitor the users' locations and check traffic conditions using a service (e.g., map service 145, search service 140, website 130, and/or application service 125 in FIG. 1) to assess a risk that the meet-up plan will not be successful.

The user 105 views the notification at flag 1310 and requests status from the digital assistant 112 at block 1315. In response, the digital assistant interfaces with the location-aware task automation service and/or the search service to obtain additional information at block 1320. The digital assistant, at block 1325, provides a prediction that the friend is going to be late based on context that is applicable to the friend, including her meeting status and traffic along the route to the meet-up. The digital assistant also provides a recommendation for an alternative meet-up location.

At block 1330, the user requests additional information from the digital assistant. The digital assistant obtains the requested information at flag 1335 and communicates with the user's friend at flag 1340 let her know of the change in plans.

Figure 14A:
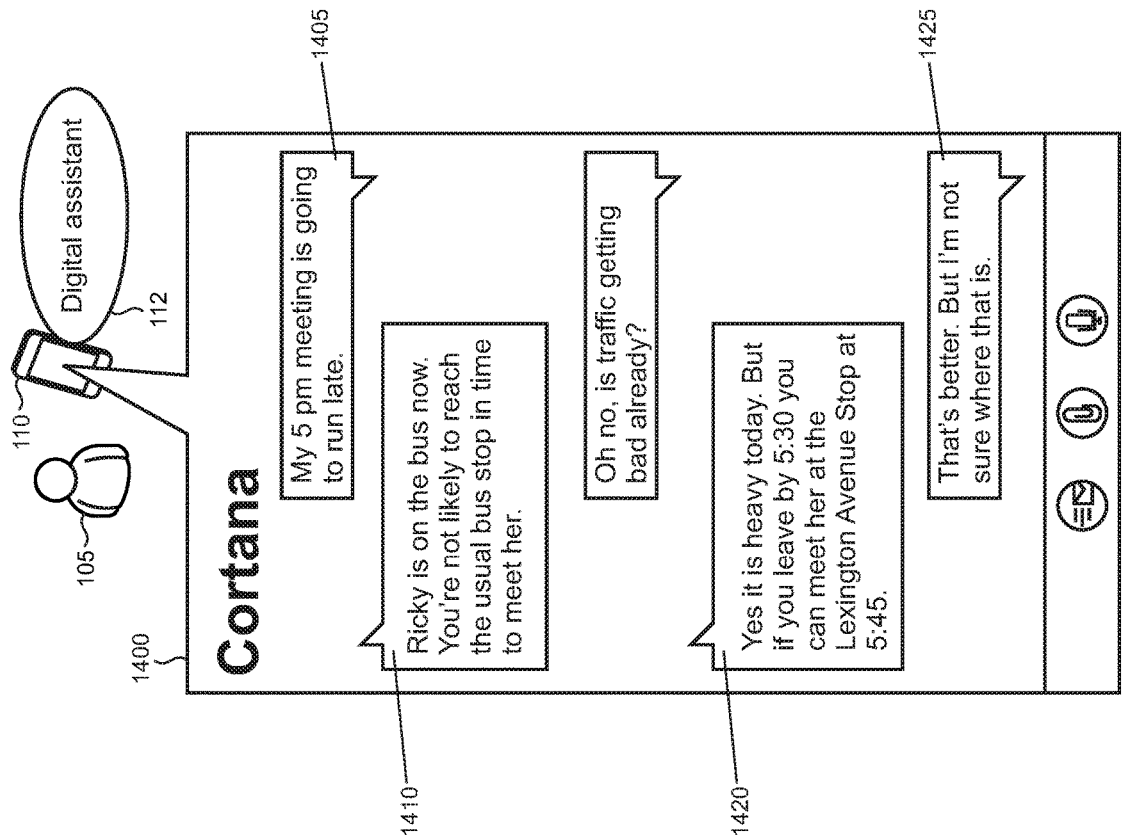
FIGS. 14A and 14B show an illustrative text messaging session between a device user and a digital assistant.
Figure 14B:
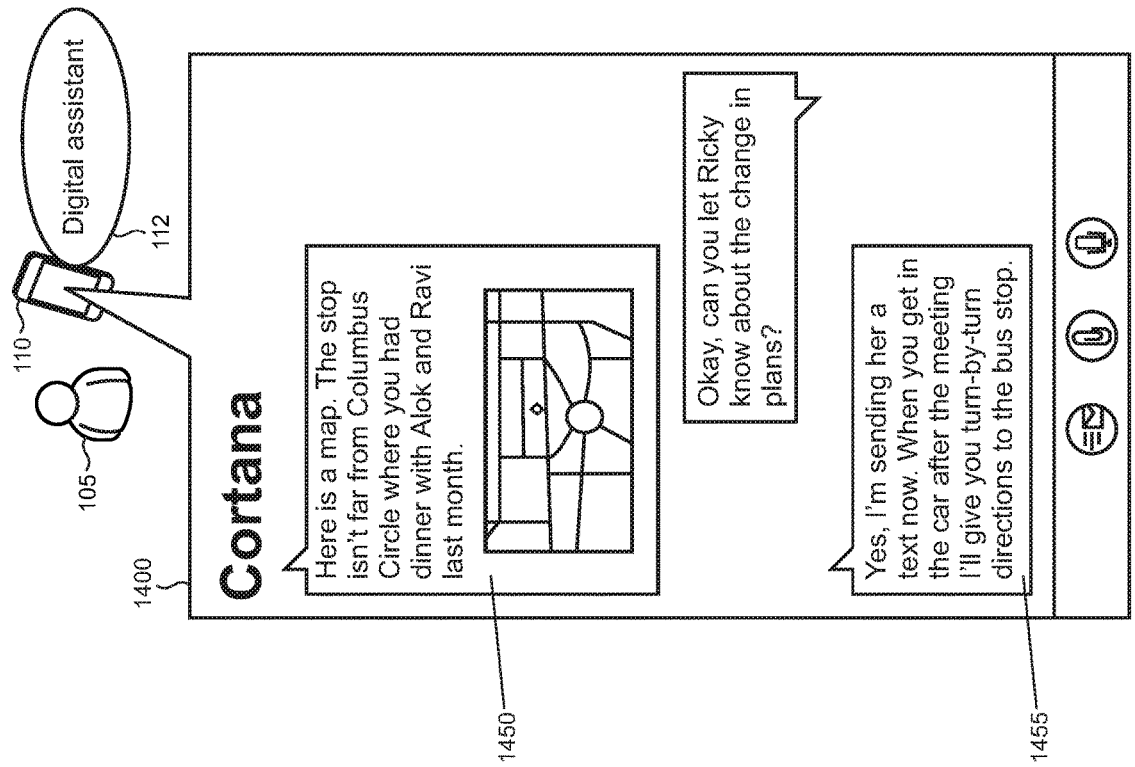

FIGS. 14A and 14B show an illustrative text messaging session on a GUI 1400 between a user 105 and a digital assistant 112 operating on a device 110. In this example, the user interacts with the digital assistant using text messages as if the digital assistant were a regular human contact of the user. The user's texts are shown on the right side of the GUI and the texts generated by the digital assistant are shown on the left side.

The location-aware task automation system 405 (FIG. 4) can employ a history of user behaviors and interactions with devices to determine that a group of two users (e.g., a mother and daughter) regularly meet up at a bus stop. Thus, in this example, the location-aware task automation system forms a group of two users that share a common meet-up location and time. While the location-aware task automation system is configured to automatically identify changes in context of a monitored group, users can also explicitly make note of a change in context. The user 105 informs the digital assistant about a change in context in text 1405, in this example, namely that her meeting is going to run late.

The digital assistant interacts with the location-aware task automation system which uses the monitored context to determine that user is predicted to miss the meet-up with her daughter. The digital assistant informs the user of the predicted miss in text message 1410. The digital assistant can further interface with the location-aware task automation system to identify and inform the user of a recommended course of action that can help the user recover from the missed meet-up in text message 1420. In this example, the recommendation includes a new meet-up location and time.

When the user asks for help in text 1425, the digital assistant can interact with suitable resources such as the map service 145 (FIG. 1) to provide a map in text message 1450 shown in FIG. 14B. The message can also include some relevant background based on the user's interaction and behavior history to assist the user in reaching the new meet-up location. The digital assistant can send a notification such as a text message, email, or call (using synthesized voice) to the user's daughter to let her know of the new location plan (i.e., the revised meet-up location and time). The digital assistant informs the user that the notification was sent in text message 1455.

Figure 15A:
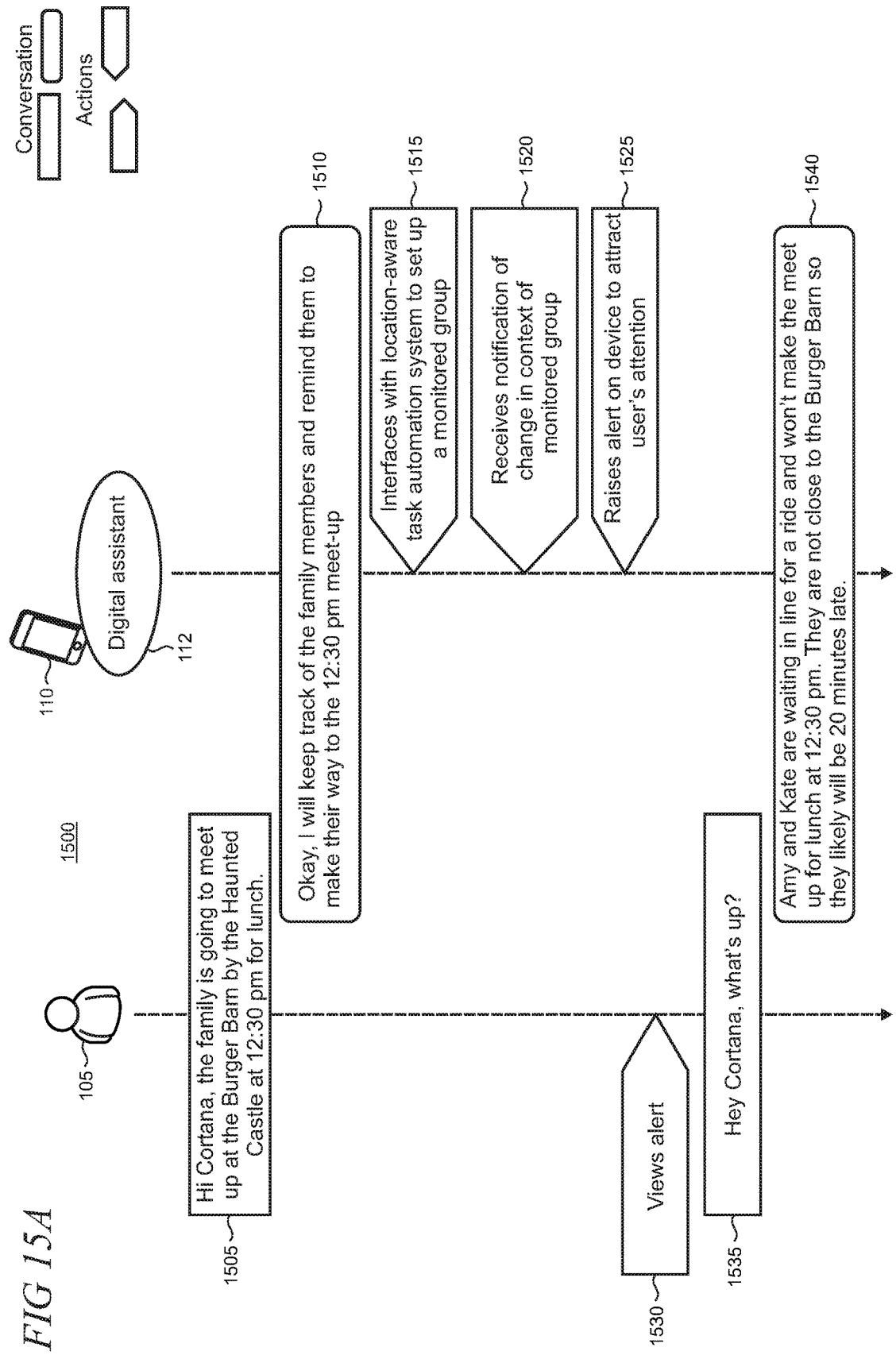
FIGS. 15A and 15B show a transcript of another illustrative user experience with a digital assistant.
Figure 15B:
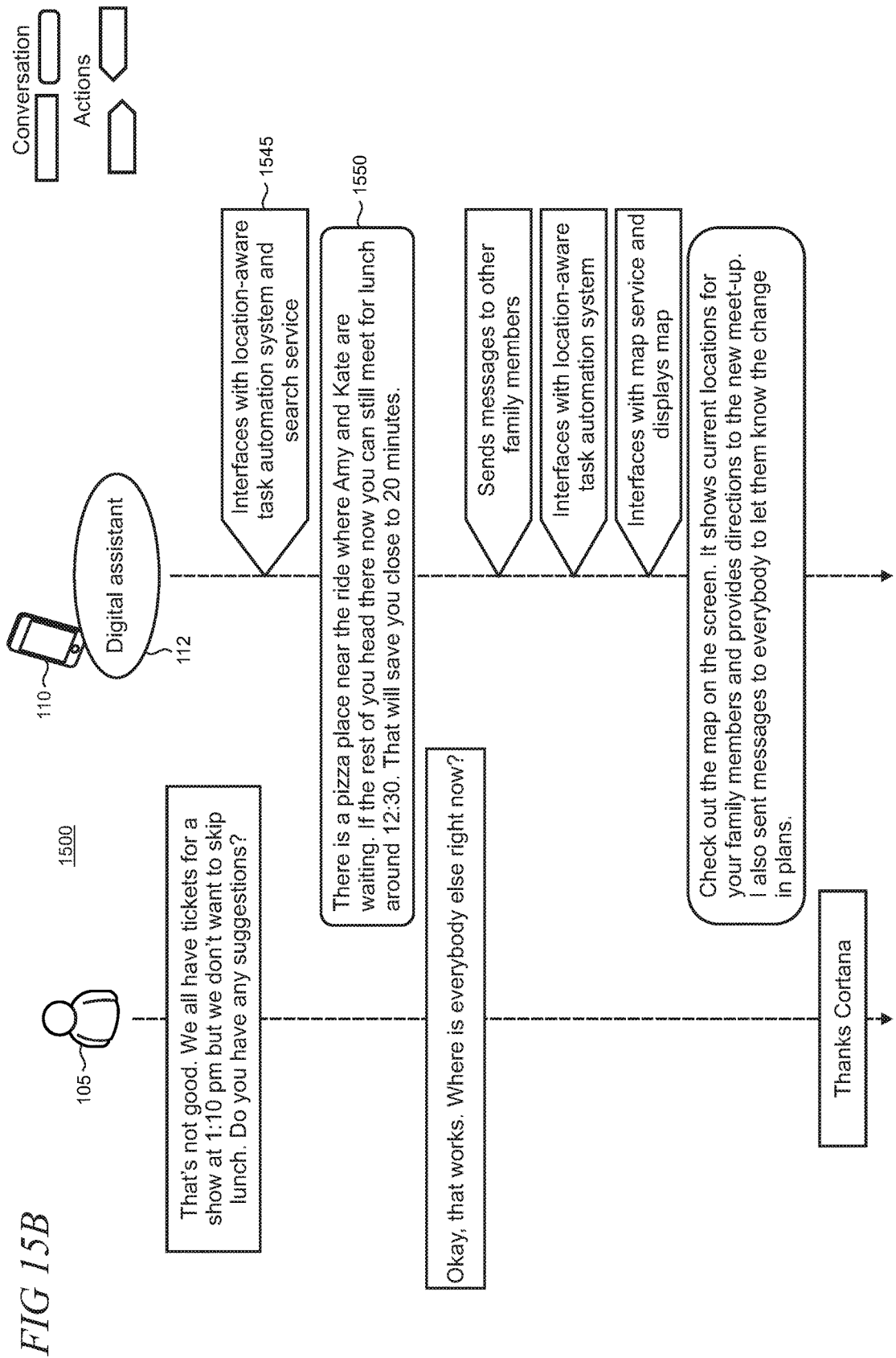

FIGS. 15A and 15B show a transcript 1500 of another illustrative user experience with a digital assistant. In this use scenario, a family group is spending the day at a large theme park. While the location-aware task automation system is configured to automatically identify a group of users who share a common location plan, users can also explicitly form groups and set location plans. As shown at block 1505, a user 105 invokes a digital assistant 112 on a device 110 and informs the digital assistant of plans for a family meet-up for lunch at a chosen time and location.

The digital assistant, at block 1510, acknowledges the user's location plan. At flag 1515, the digital assistant interfaces with the location-aware task automation system 405 (FIG. 4) to establish a group for which context is monitored. In response, the location-aware task automation system monitors context for the group and sends a notification to the digital assistant when it observes a change in the monitored context. The digital assistant receives the notification at flag 1520 and raises an alert at flag 1525 to attract the user's attention.

User views the alert at flag 1530, and requests status at block 1535. In response to the request, at block 1540, the digital assistant informs the user of a prediction that several of the family members are going to miss the meet-up plan. At flag 1545, the digital assistant interfaces with the location-aware task automation system 405 and/or search service 140 (FIG. 1) to identify an alternative meet-up location that lets the family group deal with the lateness of two of its members. The digital assistant informs the user of the suggestion at block 1550.

Figure 16:
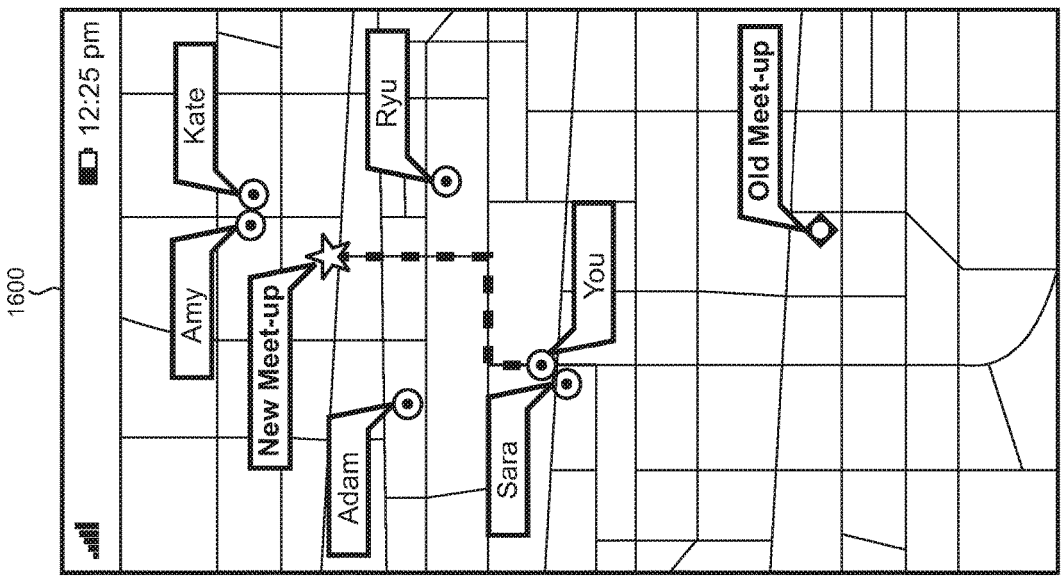
FIGS. 16 and 17 show illustrative maps which dynamically display locations of a group of device users.
Figure 17:
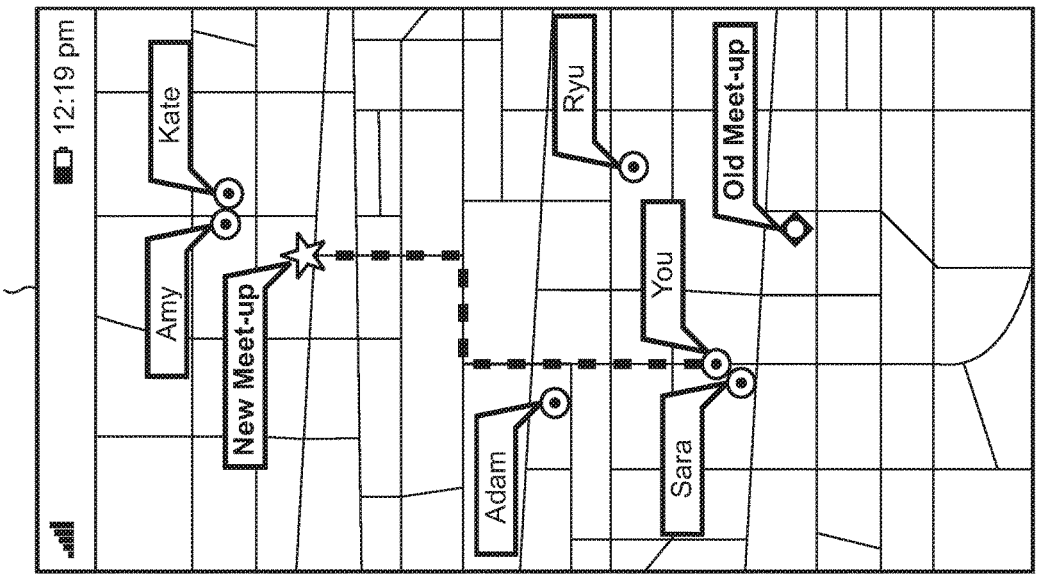

The digital assistant can interface with the location-aware task automation system and map service to provide a dynamically updated map that shows the location of each of the family members. Illustrative examples of a dynamically updated map 1600 are shown FIGS. 16 and 17 at different points in time. As shown, the map 1600 may provide directions for the user to the new meet-up location.

Figure 18A:
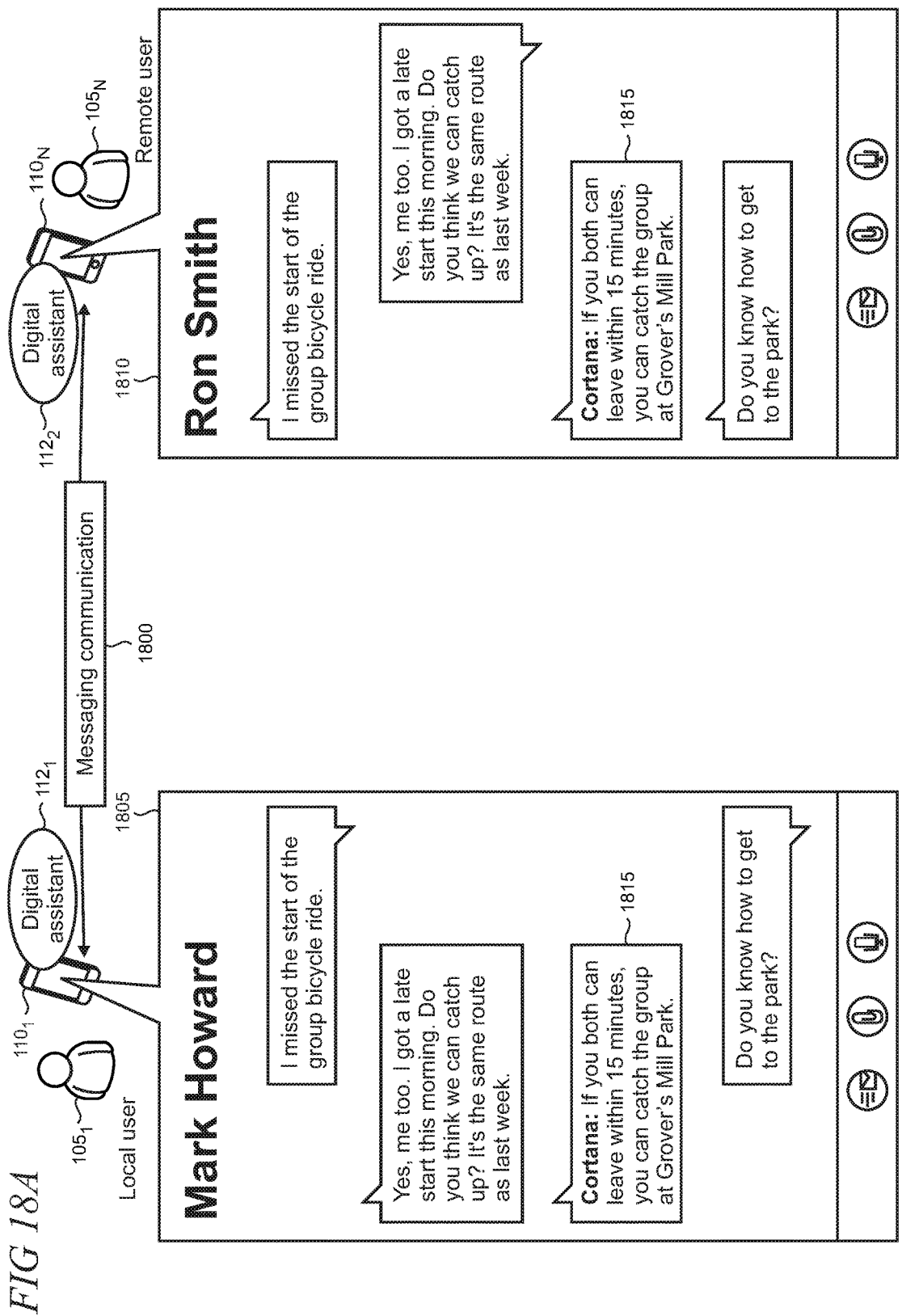

FIGS. 18A and 18B show an illustrative text messaging communication session 1800 between two device users 105. Text messages generated by the originating user are shown on the right side of the GUIs (respectively identified by reference numerals 1805 and 1810), and received text messages are shown on the left side of the GUIs. In this example, a digital assistant 112 that is instantiated on either or both devices 110 is configured to read text messages exchanged between the two users. The digital assistant determines that the users are referring to a common event, in this case, a group bicycle ride. The digital assistant can further identify that both users have missed the start of the event.

By interacting with the location-aware task automation system 405 (FIG. 4), the digital assistant can provide a recommendation for an alternative meet-up location and time that enables the users to catch up with the group. The digital assistant can surface the recommendation in a text message 1815 that appears on the GUI of each of the users' devices. When one of the users expresses uncertainty as to the new meet-up location, the digital assistant can interface with suitable resources to provide a map that is displayed in text message 1820 on each GUI, as shown in FIG. 18B.

As discussed above in the text accompanying FIGS. 15A and 15B, the location-aware task automation system 405 (FIG. 4) can surface alerts and notifications to a device user when it determines a change in context of a monitored group. For example, FIGS. 19 and 20 show illustrative notifications generated by a location-aware task automation system and displayed on device GUIs, as respectively indicated by reference numerals 1900 and 2000. In these examples, the notification is surfaced on the lock screen of device 110, however the notification can be surfaced at various different locations on a user interface supported on the device 110.

In FIG. 19, a notification 1905 indicates that members of a group are predicted to arrive at a particular meet-up location at a new meet-up time. In some implementations, the user 105 can access additional information and/or details about the change by interacting with the notification, for example tapping on the notification when the device 110 supports a touch-sensitive screen. Alternatively, the user can invoke the digital assistant and make additional inquiries about the notification through interactions with the digital assistant.

In FIG. 20, a notification 2005 indicates that a friend is predicted to miss a planned meet-up. The notification also provides a recommendation to assist the user in managing the change in plans. A similar recommendation can be surfaced on the friend's device (not shown in FIG. 20). In this example, the user 105 launches a text messaging application to communicate with his friend in a messaging communication session 2100, as shown in FIG. 21. The users confirm that they are going to follow the recommendation for the revised meet-up location and time in the text messages shown on respective GUIs 2105 and 2110.

The user can invoke the digital assistant 112 by voice, as indicated by reference numeral 2115, so that the digital assistant can perform tasks to help the users achieve the revised meet-up objective. In this case, the user requests that the digital assistant send location information to his friend. The digital assistant acknowledges the request in respective text messages 2120 and 2125, as shown.

Figure 22:
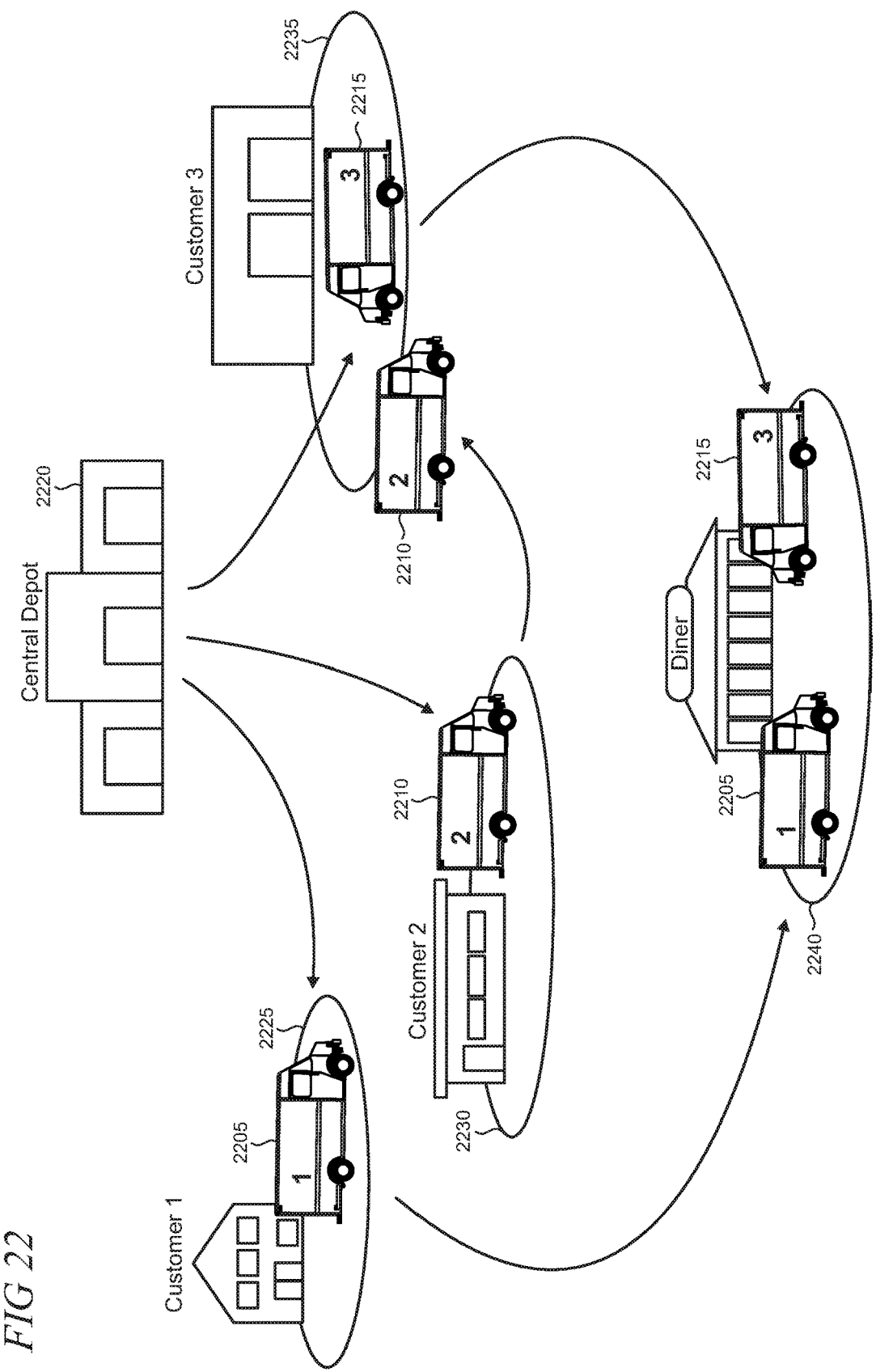
FIG. 22 shows an illustrative example of how a group of users may commonly share a location goal that includes convergent and divergent locations.

FIG. 22 shows an illustrative example of how a group of users may commonly share a location goal that includes convergent and divergent locations. The use scenario in this illustrative example involves workers using vehicles 1, 2, and 3 (respectively noted with reference numerals 2205, 2210, and 2215) for a service company having a central depot 2220. At the start of the work shift, the device users depart in vehicles 1, 2, and 3 for divergent customer locations 1, 2, and 3 (respectively noted with reference numerals 2225, 2230, and 2235) to render services. Accordingly, the group of users initially share a common goal, namely to fan out to divergent customer locations to cover the service calls for the shift.

Later in the shift, the user in vehicle 2 travels to the location of the user in vehicle 3, for example, to provide assistance in completing the service call. Thus, the users in vehicles 2 and 3 commonly share a location goal involving convergent locations. After completing their service calls, the users in vehicles 1 and 3 decide to meet up at a location 2240 for lunch (i.e., a convergent location).

Figure 23:
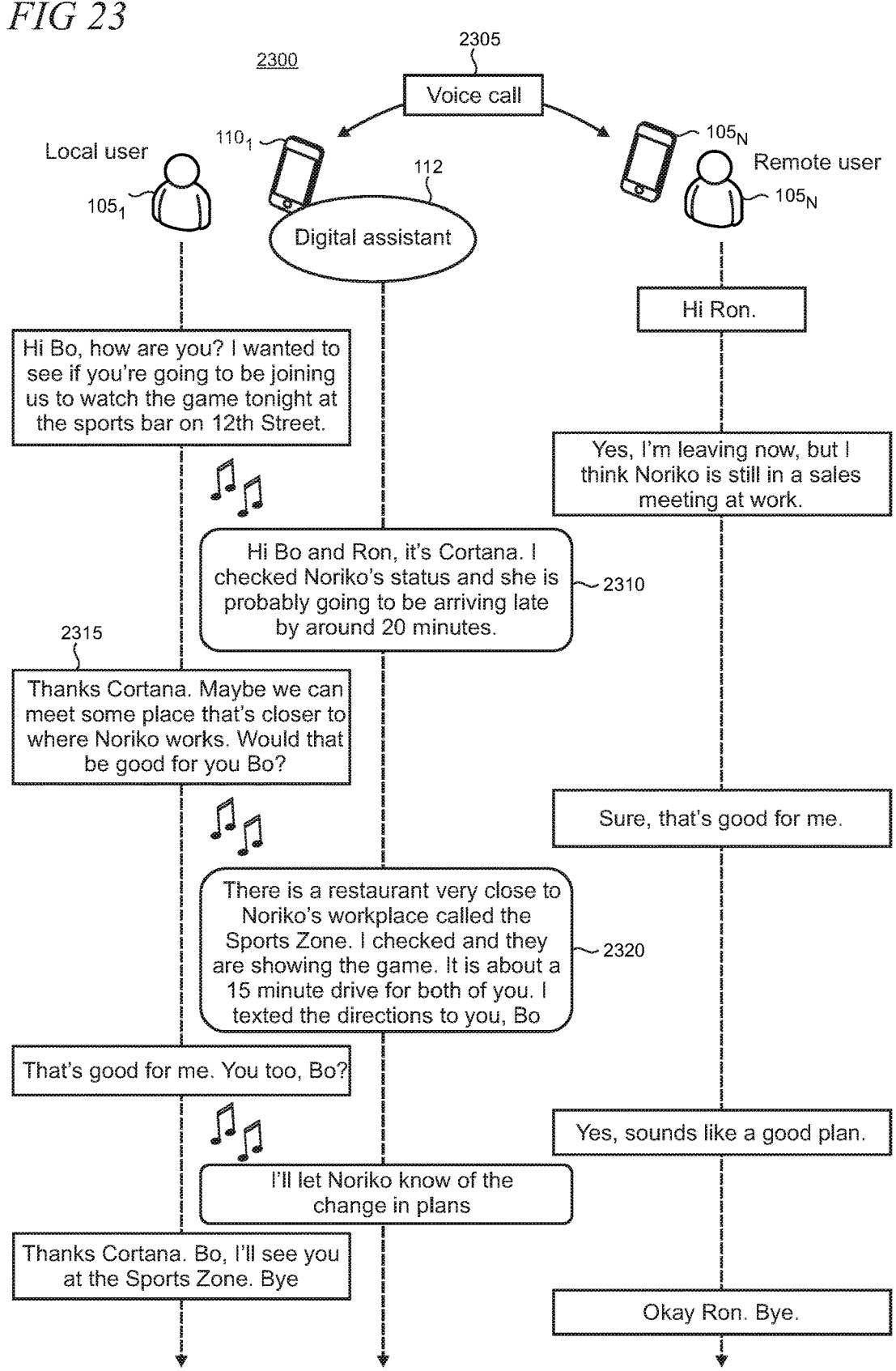
FIG. 23 shows a transcript of an illustrative voice call between two device users.

FIG. 23 shows a transcript 2300 of an illustrative voice call 2305 between two device users. In this example, a digital assistant 112 executing on the local device 110 may be configured to listen in on the call and assist the users in implementing a commonly-shared location plan. The use scenario in this example involves a group of three colleagues who are planning a meet-up to watch a televised game. When the remote user on the call indicates that the third colleague might be late, the digital assistant interfaces with the location-aware task automation system 405 (FIG. 4) to check on the status of that colleague.

The presence of the digital assistant can be announced to the users on the call in some implementations using audio such as a distinctive chime or tones. The digital assistant can use synthesized speech that can be heard by both the local and remote users, as representatively indicated by reference numeral 2310. Here, the digital assistant states a prediction that the third colleague is going be late to the meet-up and provides an estimated time of arrival. In response to a query from the local user at block 2315, the digital assistant provides a recommended workaround at block 2320. The digital assistant can also perform suitable automated tasks such as providing directions to the remote user and notifying the third colleague of the change in meet-up plans.

Figure 24:
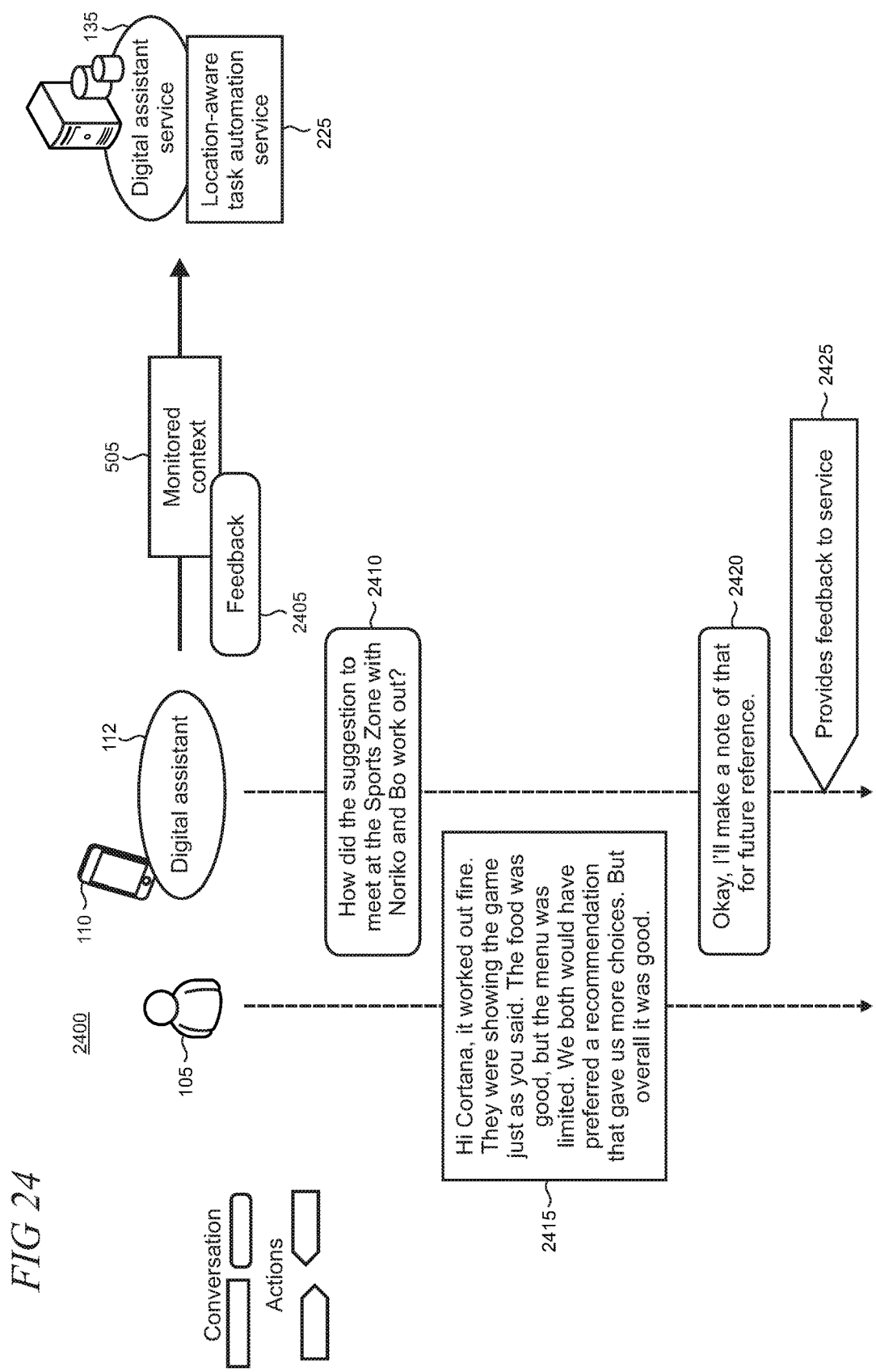
FIG. 24 shows feedback collected from a device user that is provided to a location-aware task automation service.

FIG. 24 depicts a transcript 2400 that shows that feedback 2405 may be collected from a device user 105 and provided to the location-aware task automation service 225. Feedback 2405 may be collected in various ways to enable, for example, the service to fine tune its methodologies and algorithms used to form groups, make predictions, offer suggestions and workarounds, and identify tasks that may be utilized to assist group members in meeting location objectives and/or mitigate against risks of missing such objectives.

In this example, the user 105 interacts with the digital assistant 112 using voice to provide feedback. In alternative implementations, the user can interact with other user interface elements and devices such as forms, surveys, chat widgets, and the like to provide feedback as to the quality of the task automation services. As shown, the user and digital assistant converse using natural language about a recent interaction in blocks 2410, 2415, and 2420. The digital assistant provides the collected feedback to the location-aware task automation service at flag 2425.

Figure 25:
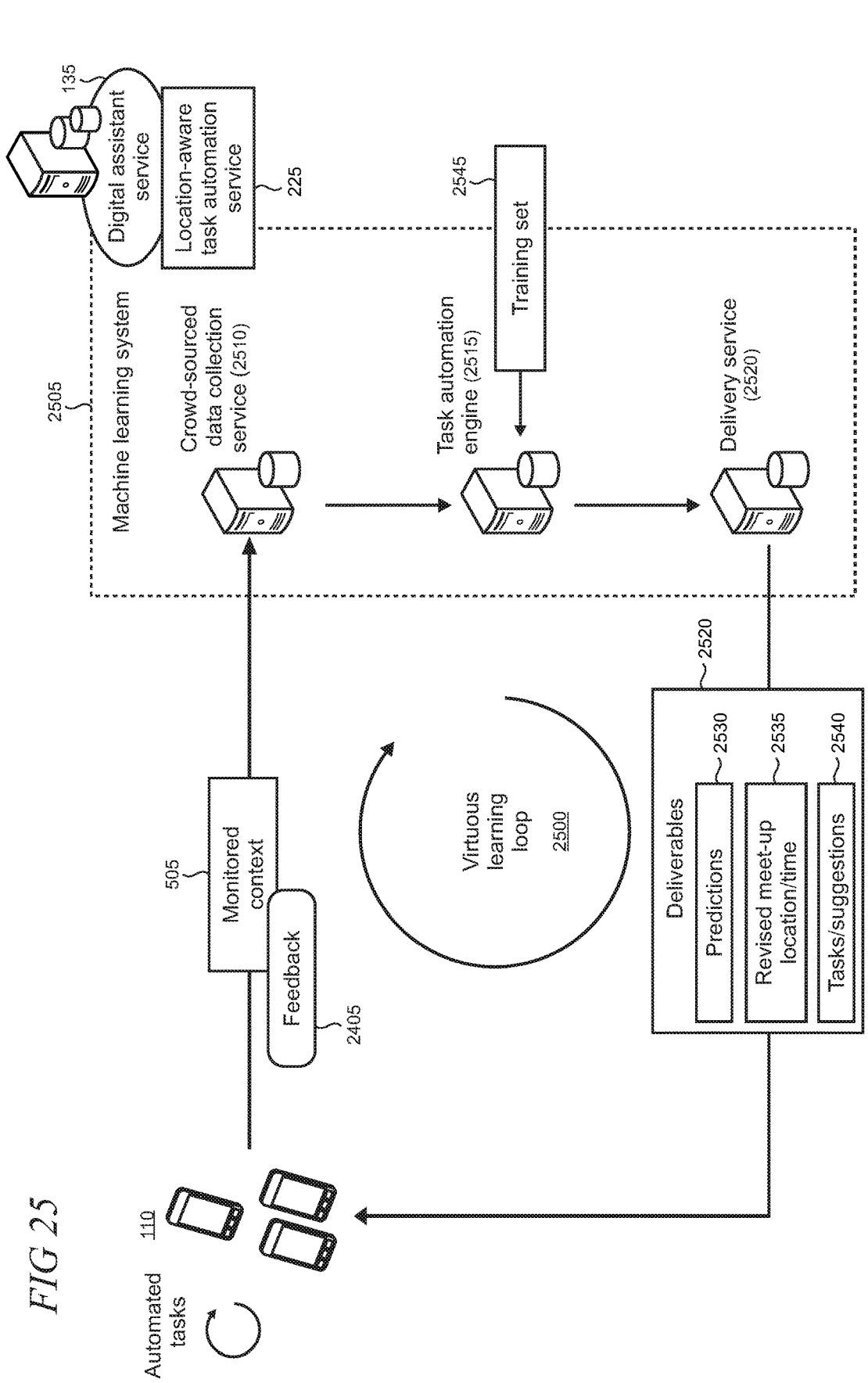
FIG. 25 shows an illustrative machine learning system that operates using a virtuous learning loop.

The collected feedback 2405 can be used in conjunction with the monitored context 505 as part of virtuous learning loop 2500 as shown in FIG. 25. The location-aware task automation service 225 can support a machine learning system 2505 that supports a crowd-sourced data collection service 2510 that is configured to receive context from monitored groups of devices 110 and user feedback 2405. The crowd-sourced data is fed to a task-automation engine 2515 that applies suitable methodologies to produce deliverables 2520 to the devices 110. A delivery service 2525 in the machine learning system is configured to provide the deliverables to the device 110. As shown, the deliverables include predictions 2530, revised meet-up locations and/or times 2535, and identified tasks and/or suggestions 2540.

A training set 2545 is used to provide initial data to the task automation engine 2515. Human analysts typically curate the training set to define the correct data variables and data features that drive the task automation engine and to separate valuable data from noise. Once the training set is created and input to the task automation engine, operations of the engine can be largely automated and run as a virtuous loop that typically provides increasingly accurate deliverables over time.

Figure 26:
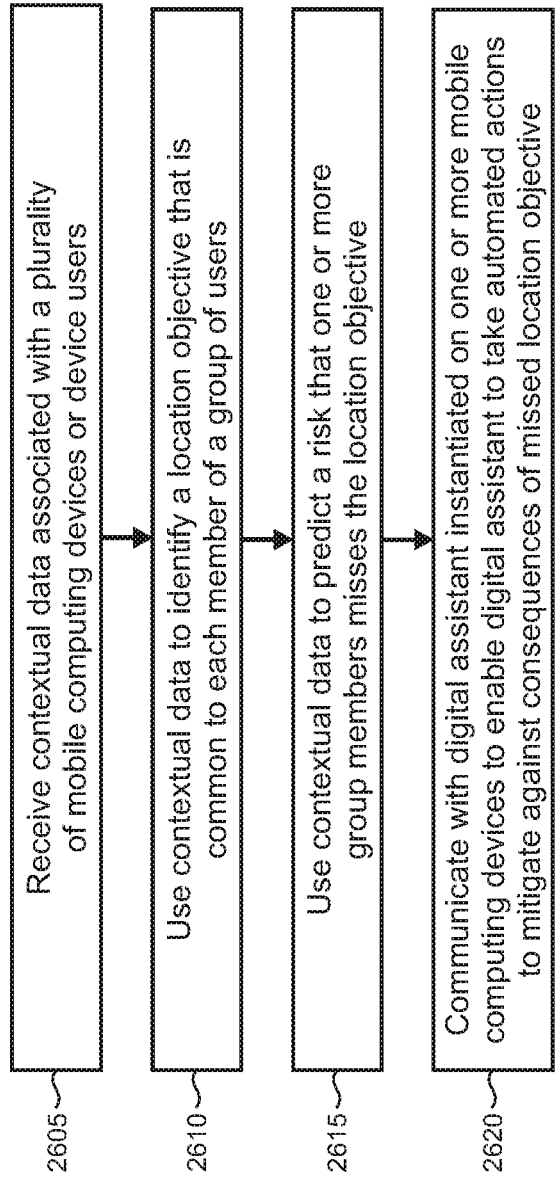
FIGS. 26, 27, and 28 show illustrative methods that may be performed when implementing the present task automation using location-awareness of multiple devices.

FIG. 26 is a flowchart of an illustrative method 2600 which may be performed, for example, by a computer server associated with the location-aware task automation service 225 (FIG. 2). Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2605, contextual data associated with one or more of a plurality of mobile computing devices or one or more of a plurality of respective different users is received. In step 2610, the contextual data is used to identify a location objective that is common to each member of a group of users. In step 2615, the contextual data is used to predict a risk of one or more members of the group missing the location objective. In step 2620, the server communicates with a digital assistant instantiated on one or more of the mobile computing devices associated with the group to enable the digital assistant to take automated actions to mitigate against consequences of the missed location objective.

Figure 27:
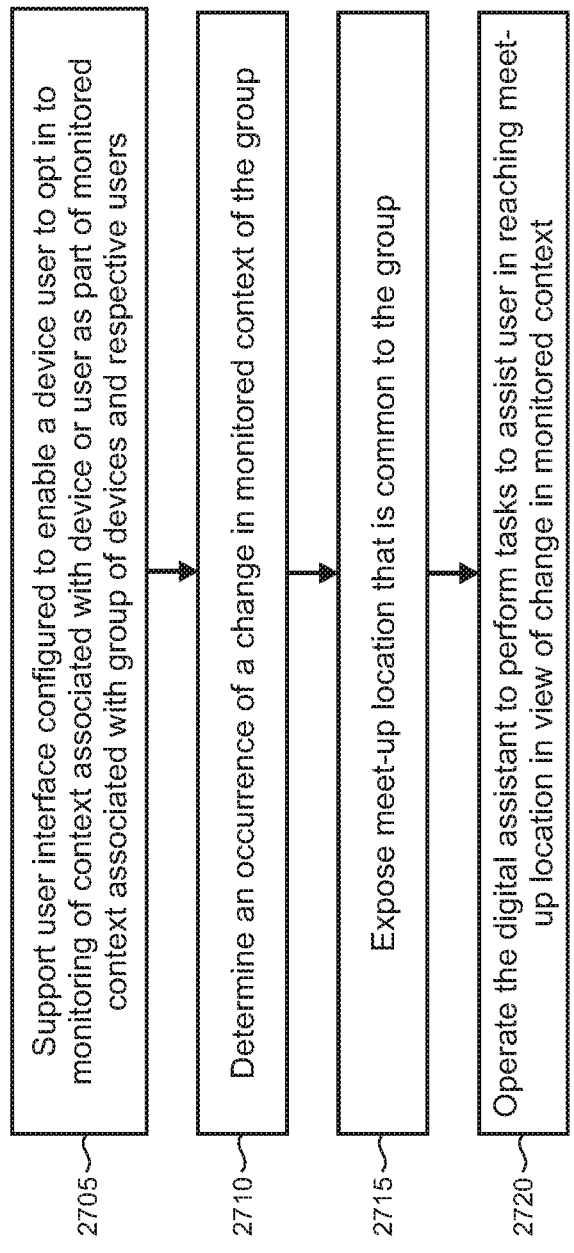

FIG. 27 is a flowchart of an illustrative method 2700 which may be performed, for example, on a device 110 (FIG. 1). In step 2705, the device supports a user interface configured to enable a device user to opt in to monitoring of context associated with the device or the user as part of monitored context associated with a group of devices and respective users. In step 2710, the device determines an occurrence of a change in the monitored context of the group. In 2715, a meet-up location that the user commonly shares with the group is exposed. In step 2720, a digital assistant on the device is operated to perform tasks to assist the user in reaching the meet-up location in view of the change in the monitored context.

Figure 28:
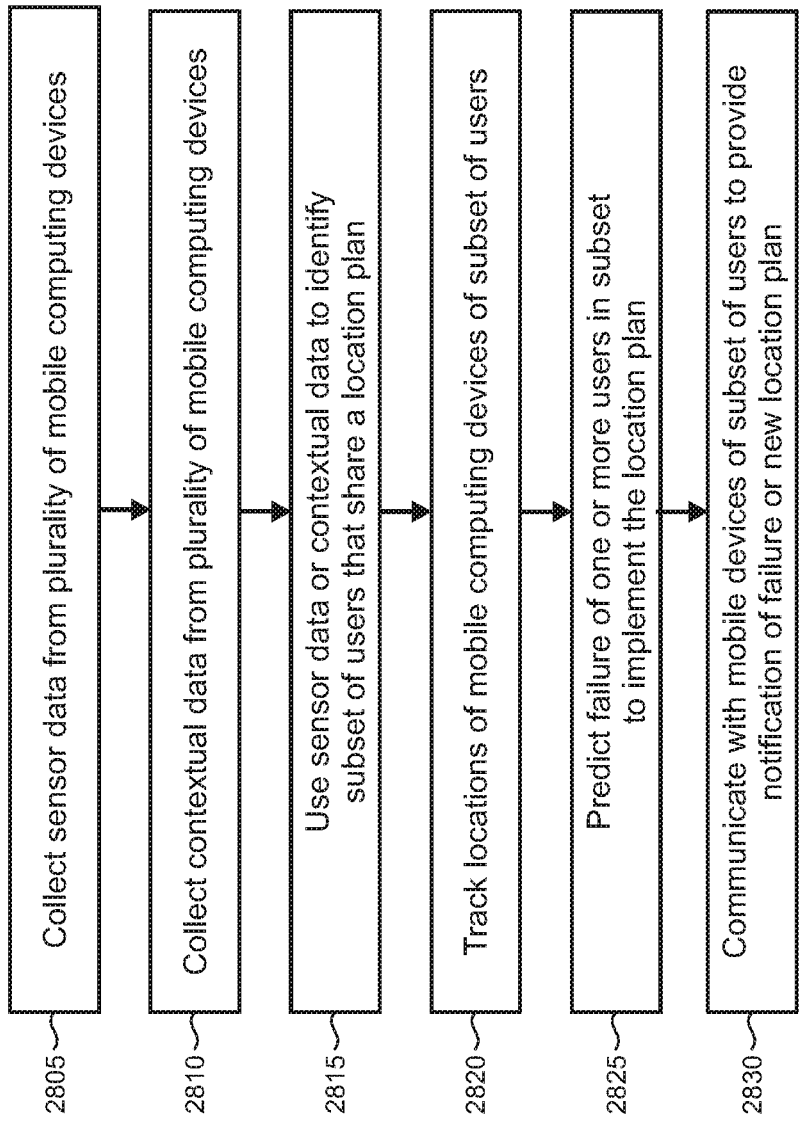

FIG. 28 is a flowchart of an illustrative method 2800 which may be performed by the location-aware task automation service 225 (FIG. 2). In step 2805, sensor data is collected in which the sensor data is generated by one or more sensors on a mobile computing device. In step 2810, contextual data is collected from mobile computing devices in which the contextual data includes information from one or more applications that execute on a mobile computing device. In step 2815 the sensor data or contextual data is used to identify a subset of users that share a location plan in which the subset of users plan, at one or more future times, to be at a single location or be at two or more different locations.

In step 2820, the sensor data or contextual data is used to track locations of the mobile computing devices of the subset of users. In step 2825, a failure of one or more users in the subset to implement the location plan is predicted based on the tracked locations. In step 2830, communications are implemented with the mobile computing devices of the subset of users, in which the communication provides a notification of the predicted failure, or provides a new location plan that specifies a new location or new future time.

Figure 29:
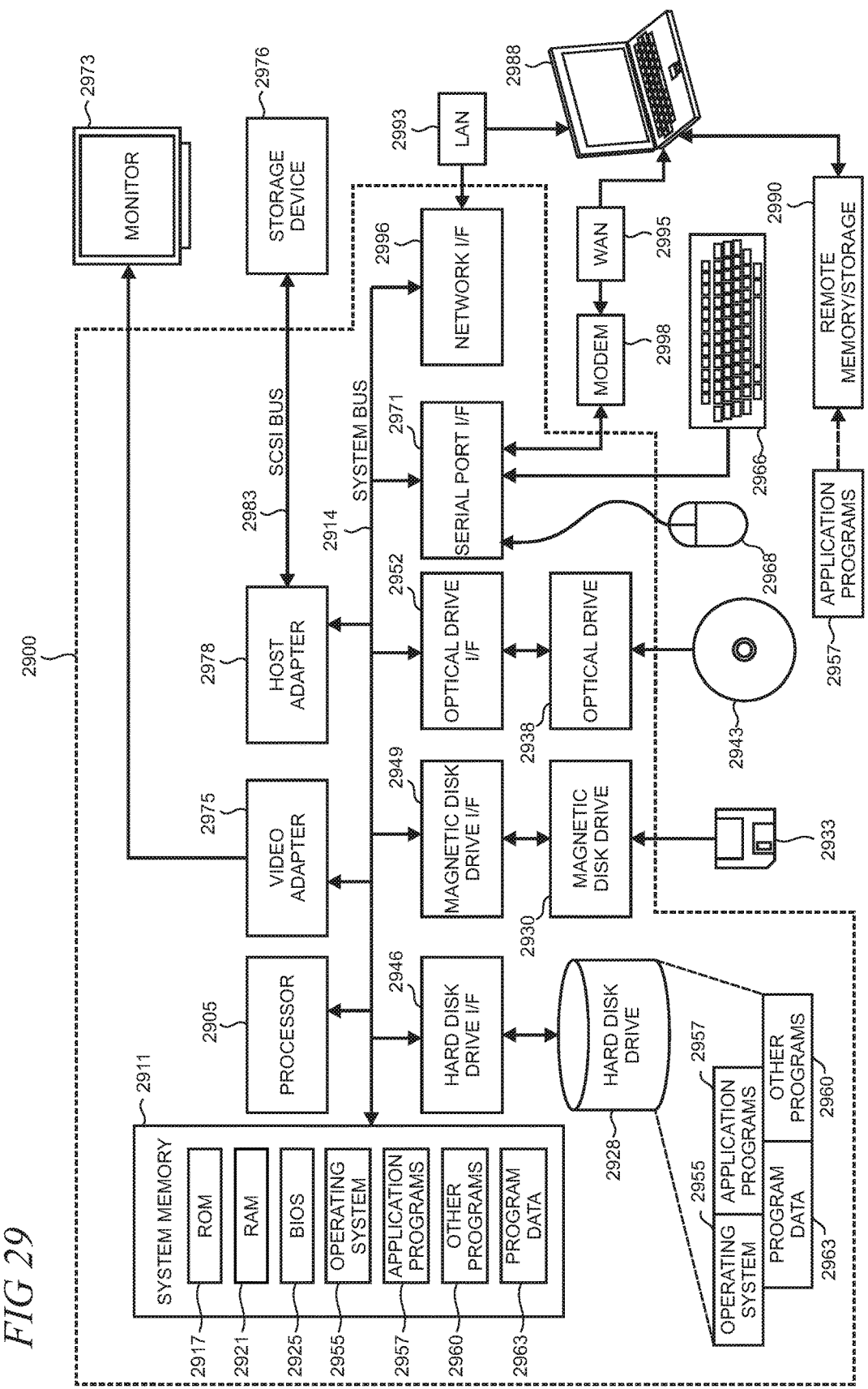
FIG. 29 is a simplified block diagram of an illustrative computer system such as a personal computer (PC) that may be used in part to implement the present task automation using location-awareness of multiple devices.

FIG. 29 is a simplified block diagram of an illustrative computer system 2900 such as a PC, client machine, or server with which the present task automation using location-awareness of multiple devices may be implemented. Computer system 2900 includes a processor 2905, a system memory 2911, and a system bus 2914 that couples various system components including the system memory 2911 to the processor 2905. The system bus 2914 may be any of several types of bus structures including a memory bus or memory controller, a peripheral bus, or a local bus using any of a variety of bus architectures. The system memory 2911 includes read only memory (ROM) 2917 and random access memory (RAM) 2921. A basic input/output system (BIOS) 2925, containing the basic routines that help to transfer information between elements within the computer system 2900, such as during startup, is stored in ROM 2917. The computer system 2900 may further include a hard disk drive 2928 for reading from and writing to an internally disposed hard disk (not shown), a magnetic disk drive 2930 for reading from or writing to a removable magnetic disk 2933 (e.g., a floppy disk), and an optical disk drive 2938 for reading from or writing to a removable optical disk 2943 such as a CD (compact disc), DVD (digital versatile disc), or other optical media. The hard disk drive 2928, magnetic disk drive 2930, and optical disk drive 2938 are connected to the system bus 2914 by a hard disk drive interface 2946, a magnetic disk drive interface 2949, and an optical drive interface 2952, respectively. The drives and their associated computer-readable storage media provide non-volatile storage of computer-readable instructions, data structures, program modules, and other data for the computer system 2900. Although this illustrative example includes a hard disk, a removable magnetic disk 2933, and a removable optical disk 2943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present task automation using location-awareness of multiple devices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2933, optical disk 2943, ROM 2917, or RAM 2921, including an operating system 2955, one or more application programs 2957, other program modules 2960, and program data 2963. A user may enter commands and information into the computer system 2900 through input devices such as a keyboard 2966 and pointing device 2968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2905 through a serial port interface 2971 that is coupled to the system bus 2914, but may be connected by other interfaces, such as a parallel port, game port, or universal serial bus (USB). A monitor 2973 or other type of display device is also connected to the system bus 2914 via an interface, such as a video adapter 2975. In addition to the monitor 2973, personal computers typically include other peripheral output devices (not shown), such as speakers and printers. The illustrative example shown in FIG. 29 also includes a host adapter 2978, a Small Computer System Interface (SCSI) bus 2983, and an external storage device 2976 connected to the SCSI bus 2983.

The computer system 2900 is operable in a networked environment using logical connections to one or more remote computers, such as a remote computer 2988. The remote computer 2988 may be selected as another personal computer, a server, a router, a network PC, a peer device, or other common network node, and typically includes many or all of the elements described above relative to the computer system 2900, although only a single representative remote memory/storage device 2990 is shown in FIG. 29. The logical connections depicted in FIG. 29 include a local area network (LAN) 2993 and a wide area network (WAN) 2995. Such networking environments are often deployed, for example, in offices, enterprise-wide computer networks, intranets, and the Internet.

When used in a LAN networking environment, the computer system 2900 is connected to the local area network 2993 through a network interface or adapter 2996. When used in a WAN networking environment, the computer system 2900 typically includes a broadband modem 2998, network gateway, or other means for establishing communications over the wide area network 2995, such as the Internet. The broadband modem 2998, which may be internal or external, is connected to the system bus 2914 via a serial port interface 2971. In a networked environment, program modules related to the computer system 2900, or portions thereof, may be stored in the remote memory storage device 2990. It is noted that the network connections shown in FIG. 29 are illustrative and other means of establishing a communications link between the computers may be used depending on the specific requirements of an application of the present task automation using location-awareness of multiple devices.

Figure 30:
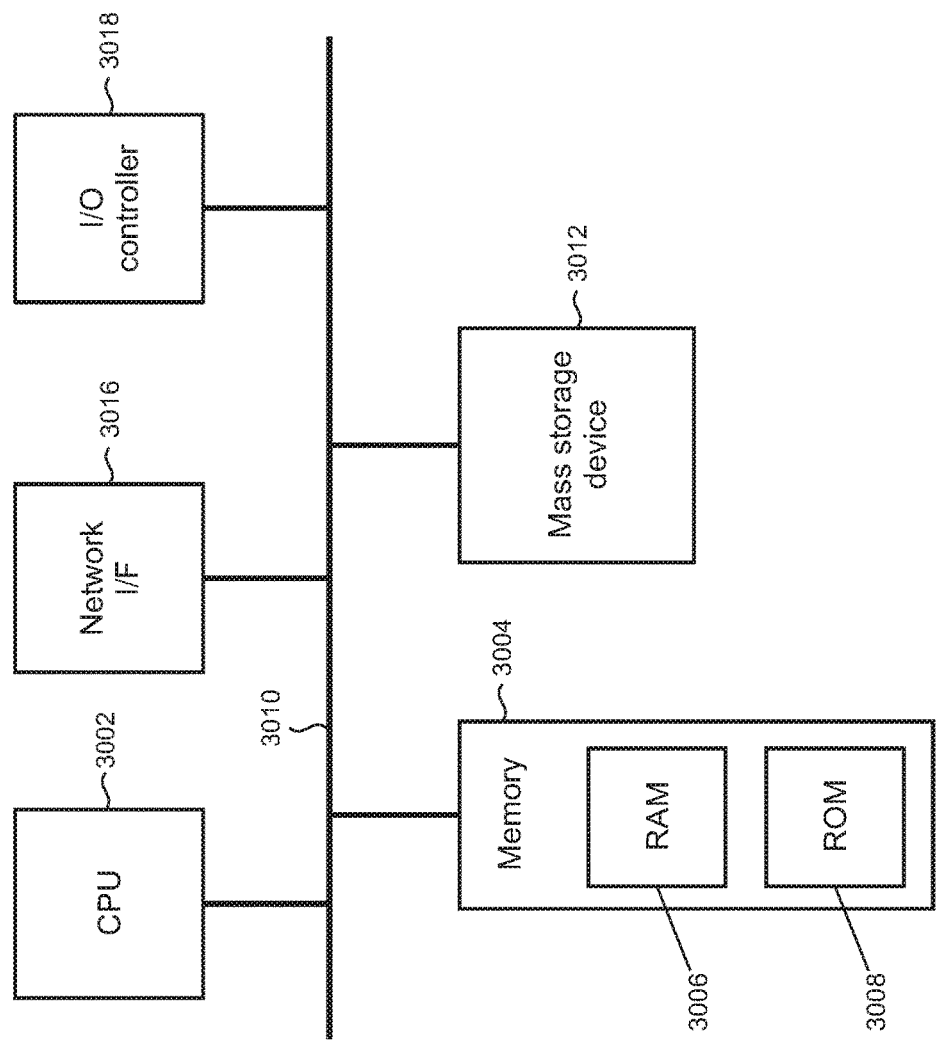
FIG. 30 shows a block diagram of an illustrative device that may be used in part to implement the present task automation using location-awareness of multiple devices.

FIG. 30 shows an illustrative architecture 3000 for a device capable of executing the various components described herein for providing the present task automation using location-awareness of multiple devices. Thus, the architecture 3000 illustrated in FIG. 30 shows an architecture that may be adapted for a server computer, mobile phone, a PDA, a smartphone, a desktop computer, a netbook computer, a tablet computer, GPS device, gaming console, and/or a laptop computer. The architecture 3000 may be utilized to execute any aspect of the components presented herein.

The architecture 3000 illustrated in FIG. 30 includes a CPU (Central Processing Unit) 3002, a system memory 3004, including a RAM 3006 and a ROM 3008, and a system bus 3010 that couples the memory 3004 to the CPU 3002. A basic input/output system containing the basic routines that help to transfer information between elements within the architecture 3000, such as during startup, is stored in the ROM 3008. The architecture 3000 further includes a mass storage device 3012 for storing software code or other computer-executed code that is utilized to implement applications, the file system, and the operating system.

The mass storage device 3012 is connected to the CPU 3002 through a mass storage controller (not shown) connected to the bus 3010. The mass storage device 3012 and its associated computer-readable storage media provide non-volatile storage for the architecture 3000.

Although the description of computer-readable storage media contained herein refers to a mass storage device, such as a hard disk or CD-ROM drive, it may be appreciated by those skilled in the art that computer-readable storage media can be any available storage media that can be accessed by the architecture 3000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3000.

According to various embodiments, the architecture 3000 may operate in a networked environment using logical connections to remote computers through a network. The architecture 3000 may connect to the network through a network interface unit 3016 connected to the bus 3010. It may be appreciated that the network interface unit 3016 also may be utilized to connect to other types of networks and remote computer systems. The architecture 3000 also may include an input/output controller 3018 for receiving and processing input from a number of other devices, including a keyboard, mouse, or electronic stylus (not shown in FIG. 30). Similarly, the input/output controller 3018 may provide output to a display screen, a printer, or other type of output device (also not shown in FIG. 30).

It may be appreciated that the software components described herein may, when loaded into the CPU 3002 and executed, transform the CPU 3002 and the overall architecture 3000 from a general-purpose computing system into a special-purpose computing system customized to facilitate the functionality presented herein. The CPU 3002 may be constructed from any number of transistors or other discrete circuit elements, which may individually or collectively assume any number of states. More specifically, the CPU 3002 may operate as a finite-state machine, in response to executable instructions contained within the software modules disclosed herein. These computer-executable instructions may transform the CPU 3002 by specifying how the CPU 3002 transitions between states, thereby transforming the transistors or other discrete hardware elements constituting the CPU 3002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3000 in order to store and execute the software components presented herein. It also may be appreciated that the architecture 3000 may include other types of computing devices, including handheld computers, embedded computer systems, smartphones, PDAs, and other types of computing devices known to those skilled in the art. It is also contemplated that the architecture 3000 may not include all of the components shown in FIG. 30, may include other components that are not explicitly shown in FIG. 30, or may utilize an architecture completely different from that shown in FIG. 30.

Figure 31:
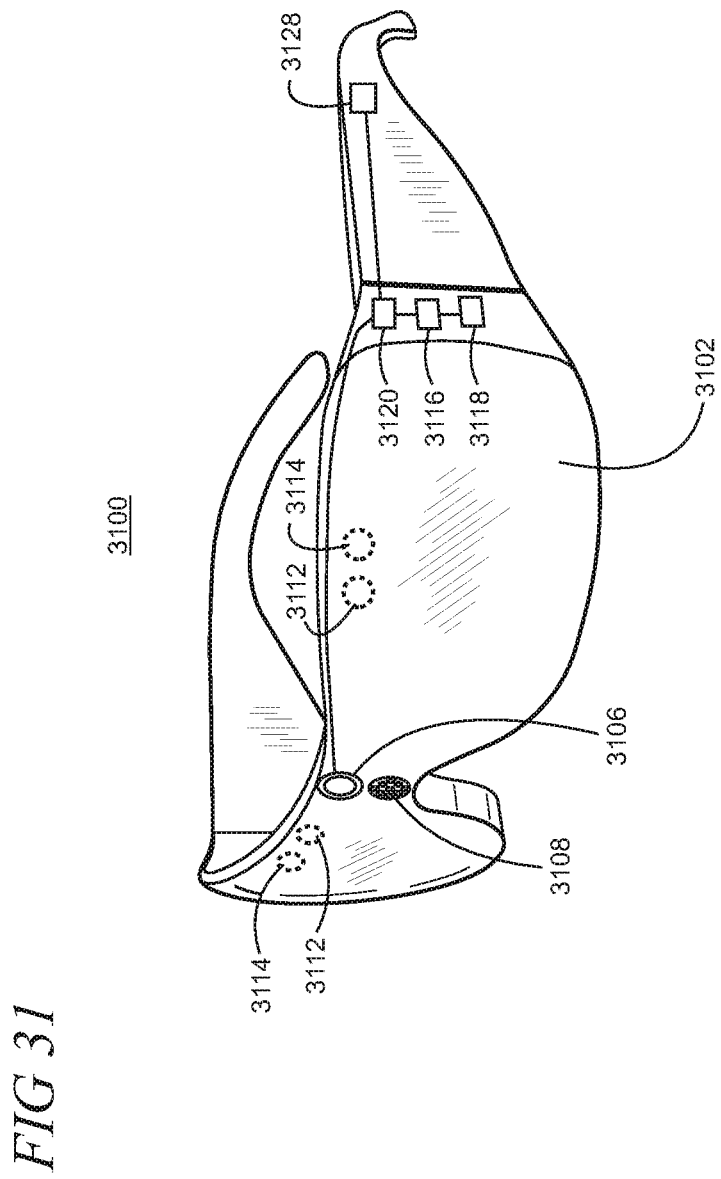
FIG. 31 is a pictorial view of an illustrative example of a virtual reality or mixed reality HMD device.
Figure 32:
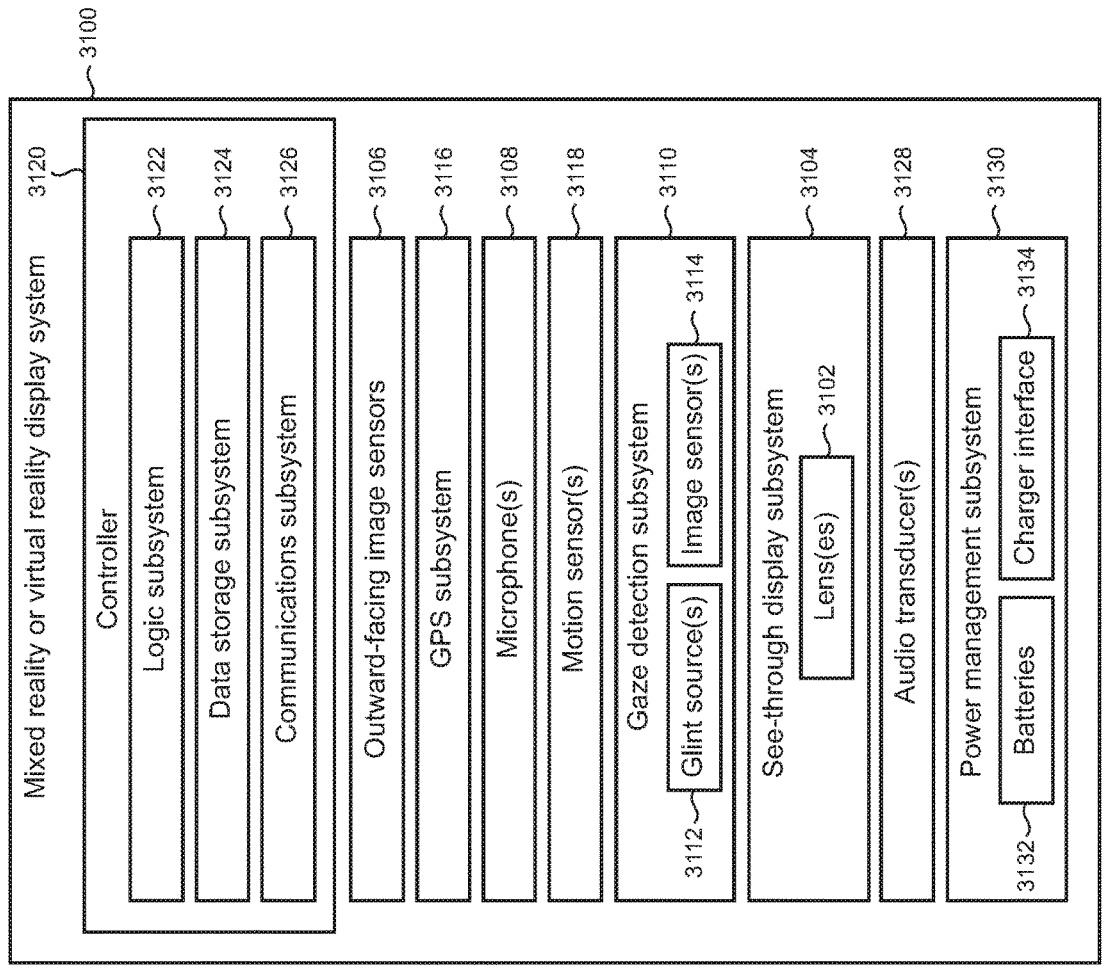
FIG. 32 shows a block diagram of an illustrative example of a virtual reality or mixed reality HMD device.

FIG. 31 shows one particular illustrative example of a see-through, augmented reality or virtual reality display system 3100, and FIG. 32 shows a functional block diagram of the system 3100. Display system 3100 comprises one or more lenses 3102 that form a part of a see-through display subsystem 3104, such that images may be displayed using lenses 3102 (e.g. using projection onto lenses 3102, one or more waveguide systems incorporated into the lenses 3102, and/or in any other suitable manner). Display system 3100 further comprises one or more outward-facing image sensors 3106 configured to acquire images of a background scene and/or physical environment being viewed by a user, and may include one or more microphones 3108 configured to detect sounds, such as voice commands from a user. Outward-facing image sensors 3106 may include one or more depth sensors and/or one or more two-dimensional image sensors. In alternative arrangements, as noted above, an augmented reality or virtual reality display system, instead of incorporating a see-through display subsystem, may display augmented reality or virtual reality images through a viewfinder mode for an outward-facing image sensor.

The display system 3100 may further include a gaze detection subsystem 3110 configured for detecting a direction of gaze of each eye of a user or a direction or location of focus, as described above. Gaze detection subsystem 3110 may be configured to determine gaze directions of each of a user's eyes in any suitable manner. For example, in the illustrative example shown, a gaze detection subsystem 3110 includes one or more glint sources 3112, such as infrared light sources, that are configured to cause a glint of light to reflect from each eyeball of a user, and one or more image sensors 3114, such as inward-facing sensors, that are configured to capture an image of each eyeball of the user. Changes in the glints from the user's eyeballs and/or a location of a user's pupil, as determined from image data gathered using the image sensor(s) 3114, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 3110 may have any suitable number and arrangement of light sources and image sensors. In some implementations, the gaze detection subsystem 3110 may be omitted.

The display system 3100 may also include additional sensors. For example, display system 3100 may comprise a global positioning system (GPS) subsystem 3116 to allow a location of the display system 3100 to be determined. This may help to identify real-world objects, such as buildings, etc. that may be located in the user's adjoining physical environment.

The display system 3100 may further include one or more motion sensors 3118 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 3106. The use of motion data may allow changes in gaze location to be tracked even if image data from outward-facing image sensor(s) 3106 cannot be resolved.

In addition, motion sensors 3118, as well as microphone(s) 3108 and gaze detection subsystem 3110, also may be employed as user input devices, such that a user may interact with the display system 3100 via gestures of the eye, neck and/or head, as well as via verbal commands in some cases. It may be understood that sensors illustrated in FIGS. 31 and 32 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 3100 can further include a controller 3120 having a logic subsystem 3122 and a data storage subsystem 3124 in communication with the sensors, gaze detection subsystem 3110, display subsystem 3104, and/or other components through a communications subsystem 3126. The communications subsystem 3126 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 3124 may include instructions stored thereon that are executable by logic subsystem 3122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 3100 is configured with one or more audio transducers 3128 (e.g., speakers, earphones, etc.) so that audio can be utilized as part of an augmented reality or virtual reality experience. A power management subsystem 3130 may include one or more batteries 3132 and/or protection circuit modules (PCMs) and an associated charger interface 3134 and/or remote power interface for supplying power to components in the display system 3100.

It may be appreciated that the display system 3100 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 33:
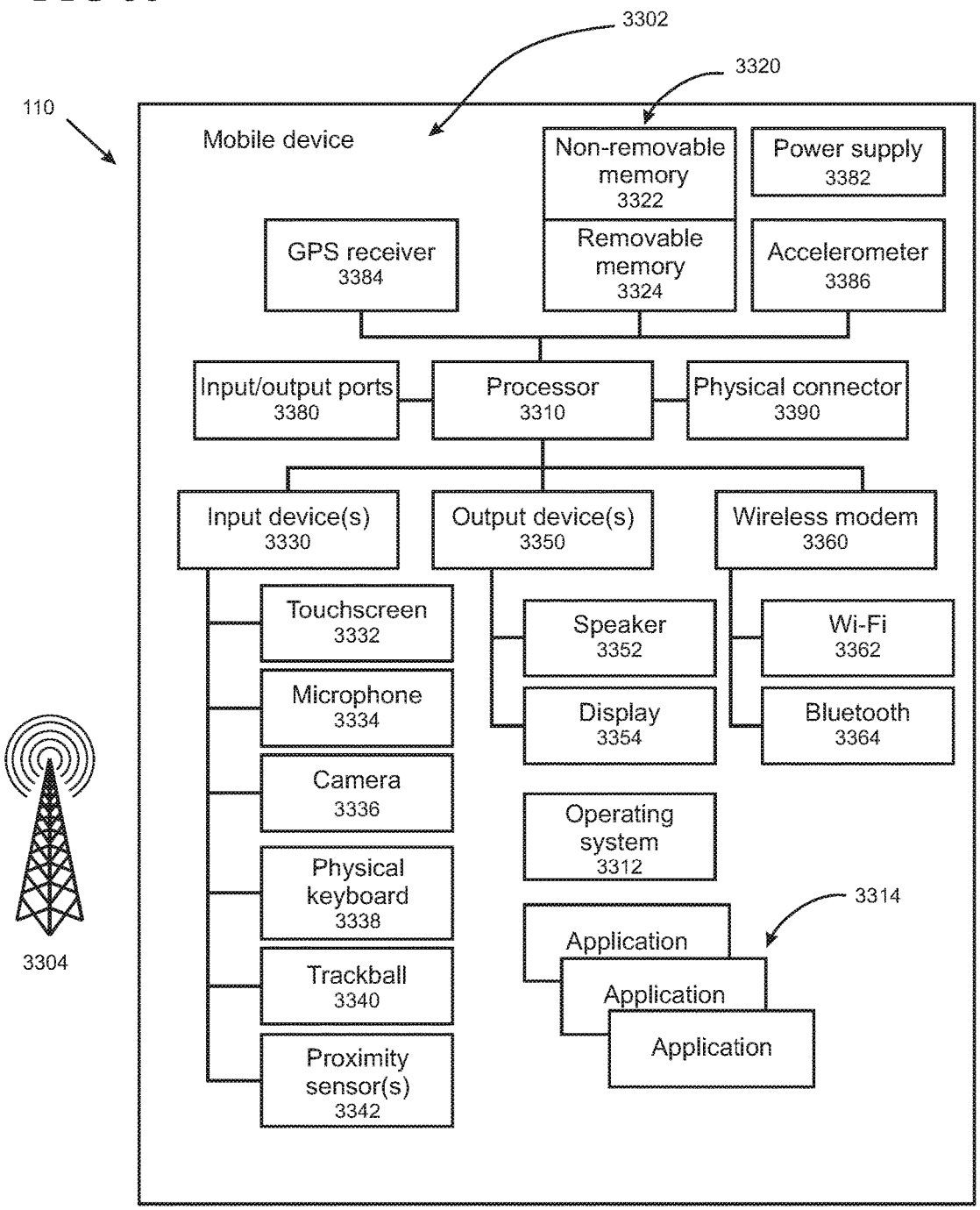
FIG. 33 is a block diagram of an illustrative device such as a mobile phone or smartphone.

FIG. 33 is a functional block diagram of an illustrative device 110 such as a mobile phone or smartphone including a variety of optional hardware and software components, shown generally at 3302. Any component 3302 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 3304, such as a cellular or satellite network.

The illustrated device 110 can include a controller or processor 3310 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 3312 can control the allocation and usage of the components 3302, including power states, above-lock states, and below-lock states, and provides support for one or more application programs 3314. The application programs can include common mobile computing applications (e.g., image-capture applications, email applications, calendars, contact managers, web browsers, messaging applications), or any other computing application.

The illustrated device 110 can include memory 3320. Memory 3320 can include non-removable memory 3322 and/or removable memory 3324. The non-removable memory 3322 can include RAM, ROM, Flash memory, a hard disk, or other well-known memory storage technologies. The removable memory 3324 can include Flash memory or a Subscriber Identity Module (SIM) card, which is well known in GSM (Global System for Mobile communications) systems, or other well-known memory storage technologies, such as "smart cards." The memory 3320 can be used for storing data and/or code for running the operating system 3312 and the application programs 3314. Example data can include web pages, text, images, sound files, video data, or other data sets to be sent to and/or received from one or more network servers or other devices via one or more wired or wireless networks.

The memory 3320 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 3320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 3330; such as a touchscreen 3332; microphone 3334 for implementation of voice input for voice recognition, voice commands and the like; camera 3336; physical keyboard 3338; trackball 3340; and/or proximity sensor 3342; and one or more output devices 3350, such as a speaker 3352 and one or more displays 3354. Other input devices (not shown) using gesture recognition may also be utilized in some cases. Other possible output devices (not shown) can include piezoelectric or haptic output devices. Some devices can serve more than one input/output function. For example, touchscreen 3332 and display 3354 can be combined into a single input/output device.

A wireless modem 3360 can be coupled to an antenna (not shown) and can support two-way communications between the processor 3310 and external devices, as is well understood in the art. The modem 3360 is shown generically and can include a cellular modem for communicating with the mobile communication network 3304 and/or other radio-based modems (e.g., Bluetooth 3364 or Wi-Fi 3362). The wireless modem 3360 is typically configured for communication with one or more cellular networks, such as a GSM network for data and voice communications within a single cellular network, between cellular networks, or between the device and a public switched telephone network (PSTN).

The device can further include at least one input/output port 3380, a power supply 3382, a satellite navigation system receiver 3384, such as a GPS receiver, an accelerometer 3386, a gyroscope (not shown), and/or a physical connector 3390, which can be a USB port, IEEE 1394 (FireWire) port, and/or an RS-232 port. The illustrated components 3302 are not required or all-inclusive, as any components can be deleted and other components can be added.

Various exemplary embodiments of the present task automation using location-awareness of multiple devices are now presented by way of illustration and not as an exhaustive list of all embodiments. An example includes one or more hardware-based computer-readable memory devices storing instructions which, when executed by one or more processors disposed in a computer server, cause the computer server to: receive contextual data associated with one or more of a plurality of mobile computing devices or one or more of a plurality of respective different users, wherein the contextual data comprises sensor data from mobile computing device sensors including geographical location information, or user data describing interactions between a user and a respective mobile computing device; use the contextual data to identify a location objective that is common to each member of a group of the users; use the contextual data to predict a risk of one or more members of the group missing the location objective; and communicate with a digital assistant instantiated on one or more of the mobile computing devices associated with the group so that the digital assistant is enabled to take automated actions to mitigate against consequences of the missed location objective.

In another example, the automated actions include responding to user queries for status of one or more members in the group of users. In another example, the automated actions include providing current locations for one or more members in the group of users. In another example, the executed instructions cause the computer server to provide a notification to one or more of the devices associated with respective members of the group, the notification indicating that at least one member of the group is predicted to miss the location objective. In another example, the location objective comprises the members of the group being at convergent locations, or in which the location objective comprises the members of the group being at divergent locations. In another example, the executed instructions cause the computer server to determine a new location objective that is achievable by each of the one or more members of the group. In another example, the automated actions comprise providing directions to the new location objective or showing a map of the new location objective. In another example, the automated actions comprise providing an estimated time of arrival to the location objective by one or more members of the group.

A further example includes a device, comprising: one or more processors; a user interface (UI) configured to interact with a user of the device; and a hardware-based memory device storing computer-readable instructions which, when executed by the one or more processors, cause the device to support a user interface configured to enable a device user to opt in to monitoring of context associated with the device or the user as a part of monitored context associated with a group of devices and respective users, wherein the context describes and operational state of the device or a user behavior when interacting with the device, determine an occurrence of a change in the monitored context of the group, expose a meet-up location that the user commonly shares with the group, operate a digital assistant to perform tasks to assist the user in reaching the meet-up location in view of the change in the monitored context.

In another example, the executed instructions further cause the device to expose a user interface configured to enable the user to perform one of specify a meet-up location, specify the group of other device users, or send an invitation to another user to join the group. In another example, the executed instructions further cause the device to surface a notification to inform the user that one or more members of the group are predicted to miss the meet-up location. In another example, the executed instructions further cause the device to dynamically provide an update of location status for one or more members of the group. In another example, the executed instructions further cause the device to expose a meet-up time that is associated with the meet-up location. In another example, the executed instructions further cause the device to provide a revised meet-up location or a revised meet-up time. In another example, the executed instructions further cause the device to provide reasons for the revisions to the meet-up location or meet-up time. In another example, the executed instructions further cause the device to maintain context awareness using contextual data comprising one or more of time/date, location of the user or device, language, schedule, applications installed on the device, user preferences, user behaviors, user activities, stored contacts, call history, messaging history, browsing history, traffic conditions, application usage history, device type, device capabilities, or communication network type, and in which the context awareness is further maintained by using sensor data collected by sensors on the device, the sensors including one or more of camera, accelerometer, location-awareness component, thermometer, altimeter, heart rate sensor, barometer, microphone, or proximity sensor. In another example, the tasks comprise one or more of sharing contact information, reading an email to identify tasks contained therein, adding a task to a task list, showing a map, providing directions, scheduling a meeting or appointment, interacting with a user's calendar, making a telephone call, sending a message, operating a device, making a reservation, providing a reminder to the user, making a purchase, suggesting a workout, playing music, taking notes, providing information to the user or another party, answering a question from the user or another party, setting an alarm or reminder, checking social media for updates, visiting a website, interacting with a search service, sharing or showing files, sending a link to a website, or sending a link to a resource.

A further example includes a method for automating tasks for a plurality of users of a respective plurality of mobile computing devices, comprising: collecting sensor data from the mobile computing devices in which the sensor data is generated by one or more sensors on a mobile computing device; collecting contextual data from the mobile computing devices in which the contextual data includes information from one or more applications executing on a mobile computing device; using the sensor data or contextual data to identify a subset of users that share a location plan wherein the subset of users plan to be at a single location at one or more futures times, or be at two or more different locations at one or more future times; using the sensor data or contextual data to track locations of the mobile computing devices of the subset of users; predicting a failure of one or more users in the subset to implement the location plan based on the tracked locations; and communicating with mobile computing devices of the subset of users to provide a notification of the predicted failure, or to provide a new location plan that specifies a new location or new future time.

In another example, the one or more applications support functionalities including one or more of business productivity, email, messaging, scheduling application, task list, telephony, virtual meeting, or calendar. In another example, the contextual data further comprises information relating to one or more of background operation on a mobile computing device, or state of a mobile computing device.

Based on the foregoing, it may be appreciated that technologies for task automation using location-awareness of multiple devices have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. One or more hardware-based computer-readable memory devices storing instructions which, when executed by one or more processors disposed in a computer server, cause the computer server to:
   collect feedback from one or more of a plurality of mobile computing devices or one or more of a plurality of respective different users, the feedback pertaining to previous automated actions performed by the computer server or digital assistants instantiated on the one or more mobile computing devices, in which the previous automated actions performed include determining location objectives for the plurality of respective different users;
   receive contextual data associated with the one or more of the plurality of mobile computing devices or the one or more of the plurality of respective different users, wherein the contextual data comprises sensor data from mobile computing device sensors including geographical location information, or user data describing interactions between a user and a respective mobile computing device;
   use the contextual data to identify a location objective that is common to each member of a group of the plurality of respective different users;
   use the contextual data to predict a risk of one or more members of the group missing the location objective; and
   communicate with a digital assistant instantiated on one or more of the mobile computing devices associated with the group so that the digital assistant is enabled to take automated actions to mitigate against consequences of the missed location objective, wherein the automated actions include providing a new location objective that is determined using the collected feedback directed toward location objectives previously provided to the one or more of the group of the plurality of respective different users.

2. The one or more hardware-based computer-readable memory devices of claim 1 in which the automated actions include responding to user queries for status of one or more members in the group of users.

3. The one or more hardware-based computer-readable memory devices of claim 1 in which the automated actions include providing current locations for one or more members in the group of the plurality of respective different users.

4. The one or more hardware-based computer-readable memory devices of claim 1 in which the executed instructions cause the computer server to provide a notification to one or more of the mobile computing devices associated with respective members of the group, the notification indicating that at least one member of the group is predicted to miss the location objective.

5. The one or more hardware-based computer-readable memory devices of claim 1 in which the location objective comprises the members of the group being at convergent locations, or in which the location objective comprises the members of the group being at divergent locations.

6. The one or more hardware-based computer-readable memory devices of claim 1 in which the automated actions comprise providing directions to the new location objective or showing a map of the new location objective.

7. The one or more hardware-based computer-readable memory devices of claim 1 in which the automated actions comprise providing an estimated time of arrival to the location objective by one or more members of the group.

8. A device having one or more location sensors, comprising:
   one or more processors;
   a user interface (UI) configured to interact with a user of the device; and
   a hardware-based memory device storing computer-readable instructions which, when executed by the one or more processors, cause the device to configure the UI to enable the user to opt in to monitoring of context associated with the device or the user as a part of monitored context associated with a group of devices and respective users, wherein the context describes an operational state of the device or a user behavior when interacting with the device, collect feedback from at least the user of the device pertaining to previous automated actions performed by a digital assistant instantiated on the device or remotely operating, in which the previous automated actions performed include determining location objectives for the group of devices and respective users, determine an occurrence of a change in the monitored context of the group, and operate the digital assistant to perform tasks to assist the user in reaching a meet-up location in view of the change in the monitored context, wherein the digital assistant is a participant in a communication session among the users, and wherein the performed tasks include providing a new location objective that is determined using the collected feedback directed toward the location objectives previously provided to one or more users in the group.

9. The device of claim 8 in which the UI is further configured to enable the user to perform one of specify a meet-up location, specify the group of other device users, or send an invitation to another user to join the group.

10. The device of claim 8 in which the executed instructions further cause the device to surface a notification to inform the user that one or more users in the group are predicted to miss the meet-up location.

11. The device of claim 8 in which the executed instructions further cause the device to dynamically provide an update of location status for one or more users in the group.

12. The device of claim 8 in which the executed instructions further cause the device to expose the meet-up time that is associated with the meet-up location.

13. The device of claim 12 in which the new location objective includes a revised meet-up location or a revised meet-up time.

14. The device of claim 13 in which the executed instructions further cause the device to provide reasons for the revisions to the meet-up location or meet-up time.

15. The device of claim 8 in which the executed instructions further cause the device to maintain context-awareness using contextual data comprising one or more of time/date, location of the user or device, language, schedule, applications installed on the device, user preferences, user behaviors, user activities, stored contacts, call history, messaging history, browsing history, traffic conditions, application usage history, device type, device capabilities, or communication network type, and in which the context-awareness is further maintained by using sensor data collected by sensors on the device, the sensors including one or more of camera, accelerometer, location-awareness component, thermometer, altimeter, heart rate sensor, barometer, microphone, or proximity sensor.

16. The device of claim 8 in which the tasks comprise one or more of sharing contact information, reading an email to identify tasks contained therein, adding a task to a task list, showing a map, providing directions, scheduling a meeting or appointment, interacting with a user's calendar, making a telephone call, sending a message, operating a device, making a reservation, providing a reminder to the user, making a purchase, suggesting a workout, playing music, taking notes, providing information to the user or another party, answering a question from the user or another party, setting an alarm or reminder, checking social media for updates, visiting a website, interacting with a search service, sharing or showing files, sending a link to a website, or sending a link to a resource.

17. A method for automating tasks for a plurality of users of a respective plurality of mobile computing devices, comprising:

collecting sensor data from the mobile computing devices in which the sensor data is generated by one or more sensors on a respective mobile computing device;

collecting contextual data from the mobile computing devices in which the contextual data includes information from one or more applications executing on a respective mobile computing device;

using the sensor data or contextual data to identify a subset of users that share a location plan wherein the subset of users plan to be at a single location at one or more future times, or be at two or more different locations at one or more future times;

using the sensor data or contextual data to track locations of the mobile computing devices of the subset of users;

predicting a failure of one or more users in the subset to satisfy the location plan based on the tracked locations; and communicating with the mobile computing devices of the subset of users to provide a notification of the predicted failure and to provide a new location plan that specifies a new location or new future time, wherein the new location plan is at least based on previously-collected feedback directed toward location plans previously provided to the mobile computing devices.

18. The method of claim 17 in which the one or more applications support functionalities including one or more of business productivity, email, messaging, scheduling application, task list, telephony, virtual meeting, or calendar.

19. The method of claim 17 in which the contextual data further comprises information relating to one or more of background operation on respective mobile computing devices, or state of respective mobile computing devices.

* * * * *